US012750731B2

(12) United States Patent
Kahn

(10) Patent No.: US 12,750,731 B2
(45) Date of Patent: Sep. 29, 2026

(54) METHODS AND APPARATUS FOR OPTIMIZING CONFIGURATION OF EXTENSION HEADERS FOR PROTOCOL DATA UNITS OF A COMMUNICATION SYSTEM

(71) Applicant: Nokia Technologies Oy, Espoo (FI)

(72) Inventor: Colin Kahn, Morris Plains, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 287 days.

(21) Appl. No.: 18/744,340

(22) Filed: Jun. 14, 2024

(65) Prior Publication Data

US 2024/0422619 A1 Dec. 19, 2024

(30) Foreign Application Priority Data

Jun. 15, 2023 (GB) ...................................... 2308992

(51) Int. Cl.
*H04W 28/06* (2009.01)
*H04W 28/02* (2009.01)

(52) U.S. Cl.
CPC ..... *H04W 28/065* (2013.01); *H04W 28/0268* (2013.01)

(58) Field of Classification Search
CPC ........................ H04W 28/0268; H04W 28/065
See application file for complete search history.

(56) References Cited

U.S. PATENT DOCUMENTS

| | | | | | |
|---|---|---|---|---|---|
| 2008/0181216 | A1* | 7/2008 | Breau | H04L 12/66 | 370/389 |
| 2008/0247397 | A1* | 10/2008 | Gillet | H04L 45/52 | 370/392 |
| 2010/0128665 | A1* | 5/2010 | Kahn | H04L 69/161 | 370/328 |
| 2013/0039278 | A1* | 2/2013 | Bouazizi | H04L 69/22 | 370/328 |

(Continued)

OTHER PUBLICATIONS

3rd Generation Partnership Project; TR 23.700-60v0.0.0 (Feb. 2022), “Technical Specification Group Services and Systems Aspects; Study on XR (Extended Reality) and Media Services (Release 18),” 10 pages.

(Continued)

*Primary Examiner* — Kashif Siddiqui
(74) *Attorney, Agent, or Firm* — Carter, DeLuca & Farrell LLP

(57) ABSTRACT

Techniques are provided for removal of a header extension to mitigate packet fragmentation. In the context of an application function, based on determining a protocol description indicating protocol data unit (PDU) set information related to extended reality data, transmission of a handling request for the PDU set that comprises at least a request for removal of a header extension related to the PDU set is caused. Additionally, based on an indication that the header extension is removable by a user plane function of a core network, transmission of at least one PDU of the PDU set comprising the header extension is caused. Corresponding method, apparatus, and computer-readable storage mediums are also provided for a core network, a user plane function, and a user equipment.

16 Claims, 11 Drawing Sheets

(56) References Cited

U.S. PATENT DOCUMENTS

| | | | | |
|---|---|---|---|---|
| 2015/0049675 | A1* | 2/2015 | Lee | H04W 28/065 370/328 |
| 2018/0097657 | A1* | 4/2018 | Dao | H04L 41/0806 |
| 2020/0145876 | A1* | 5/2020 | Dao | H04W 28/0268 |
| 2020/0336422 | A1* | 10/2020 | Guo | H04L 67/10 |
| 2024/0064190 | A1* | 2/2024 | Yang | H04L 65/1069 |
| 2025/0184285 | A1* | 6/2025 | Schliwa-Bertling | H04L 47/80 |
| 2025/0350398 | A1* | 11/2025 | De La Oliva | H04W 12/02 |

OTHER PUBLICATIONS

3rd Generation Partnership Project; TS 123 501 v16.6.0 (Oct. 2020), "5G; System Architecture for the 5G System (5GS)," 450 pages.

3rd Generation Partnership Project; TS 123 502 v16.7.0 (Jan. 2021), "5G; Procedures for the 5G System (5GS)," 607 pages.

3rd Generation Partnership Project; TS 123 503 v16.5.0 (Jul. 2020), "5G; Policy and charging control framework for the 5G System (5GS); Stage 2" 120 pages.

Baugher, M. et al., "The Secure Real-Time Transport Protocol (SRTP)," Network Working Group, RFC 3711, Standards Track, Mar. 2004, 56 Pages.

Schulzrinne, H. et al., "RTP: A Transport Protocol for Real-Time Applications," Network Working Group, RFC 3550, Standards Track, Jul. 2003, 89 Pages.

Wang, Y-K. et al., "RTP Payload Format for H.264 Video," Internet Engineering Task Force (IETF); RFC 6184, Standards Track, May 2011, 101 pages.

Wang, Y-K. et al., RTP Payload Format for High Efficiency Video Coding (HEVC), Internet Engineering Task Force (IETF); RFC 7798, Standards Track, Mar. 2016, 86 pages.

Zanaty, M. et al., "Video Frame Marking RTP Header Extension," Network Working Group Internet-Draft; Experimental, Mar. 4, 2024, 14 pages.

Zhao, S. et al., "RTP Payload Format for Versatile Video Coding (VVC)," Internet Engineering Task Force (IETF), RFC 9328, Standards Track, Dec. 2022, 54 pages.

* cited by examiner

METHODS AND APPARATUS FOR OPTIMIZING CONFIGURATION OF EXTENSION HEADERS FOR PROTOCOL DATA UNITS OF A COMMUNICATION SYSTEM

CROSS REFERENCE TO RELATED APPLICATIONS

The present application claims priority to United Kingdom Patent Application No. 2308992.3, filed Jun. 15, 2024, and entitled "METHODS AND APPARATUS FOR OPTIMIZING CONFIGURATION OF EXTENSION HEADERS FOR PROTOCOL DATA UNITS OF A COMMUNICATION SYSTEM." and incorporates its disclosure herein by reference in its entirety.

TECHNOLOGICAL FIELD

Various example embodiments described in this subject disclosure generally relate to techniques for wireless communication and, more particularly, to techniques for configuring protocol data units for wireless communication.

BACKGROUND

A communication system can be seen as a facility that enables communication sessions between two or more entities such as user equipment (UE), base stations/access points, Network Functions (NF), and/or other nodes by providing connectivity between the various entities involved in the communication path. A communication system can be provided, for example, with a communication network and one or more compatible communication devices. Communication systems continue to evolve to extend the flexibility in the network usage, to provide improved security, and/or to provide users with improved network services. For instance, fourth generation (4G) wireless mobile telecommunications technology, also known as Long Term Evolution (LTE) technology, was designed to provide high-capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) has developed standards for 5G technology, including standards for next generation radio access networks and 5G network architectures that can deliver extreme broadband, ultra-robust, low latency connectivity as well as high data rate low latency connectivity for interactive media services. 5G technology improves a variety of telecommunication services offered to the end users and helps to support massive broadband that delivers gigabytes of bandwidth per second on demand for both the uplink and downlink transmissions. Next generation networks, which are based on the 5G network architecture, utilize radio access network (RAN) functions and core network functions to transmit data such as, for example, extended reality data via protocol data units (PDUs). These PDUs may be grouped into a PDU set comprising one or more PDUs carrying a payload of one units of information generated at an application level (e.g., a video frame or a video slice for an extended reality service). However, in certain scenarios under current network protocols, a PDU may be inefficiently configured and/or transmitted via a network.

BRIEF SUMMARY

Various example embodiments generally relate to techniques for removing a header extension. In an example embodiment, the method, apparatus, and computer program product are configured to control removal of a header extension, thereby allowing for mitigation of packet fragmentation.

In an example embodiment, a method is provided that includes, based on determining a protocol description indicating protocol data unit (PDU) set information related to extended reality, causing transmission of a handling request for the PDU set that comprises at least a request for removal of a header extension related to the PDU set. The method further includes, based on an indication that the header extension is removable by a user plane function of a core network, causing transmission of at least one PDU of the PDU set comprising the header extension.

The method of an example embodiment comprises a header extension, wherein the header extension is a real-time protocol (RTP) header extension. In an example embodiment, the protocol description comprises information regarding the header extension. In an example embodiment, the protocol description comprises information regarding at least one of the following: an application protocol, header type, and/or payload type. In an example embodiment, the causing transmission of the handling request comprises causing transmission of the handling request to a policy control function of the core network.

The method of an example embodiment the causing transmission of the at least one PDU comprises causing transmission of the at least one PDU comprising the header extension to the user plane function to facilitate removal of the header extension from the at least one PDU via the user plane function.

The method of an example embodiment the causing transmission of the at least one PDU comprises causing transmission of the at least one PDU comprising the header extension to the user plane function to facilitate provision of the at least one PDU without the header extension to a user equipment. In an example embodiment, the handling request further comprises the protocol description for the PDU set.

In another example embodiment, an apparatus is provided that includes at least one processor and at least one memory storing instructions, that, when executed by the at least one processor, cause the apparatus to, based on determining a protocol description indicating data unit (PDU) set information related to extended reality data, cause transmission of a handling request for the PDU set that comprises at least a request for removal of a header extension related to the PDU set. The apparatus is further caused, based on an indication that the header extension is removable by a user plane function of a core network, cause transmission of at least one PDU of the PDU set that comprises the header extension.

The apparatus of an example embodiment comprises a header extension, wherein the header extension is a real-time protocol (RTP) header extension. In an example embodiment, the protocol description comprises information regarding the header extension. In an example embodiment, the protocol description comprises information regarding at least one of the following: an application protocol, header type, and/or payload type. In an example embodiment, the causing transmission of the handling request comprises causing transmission of the handling request to a policy control function of the core network.

The apparatus of an example embodiment the causing transmission of the at least one PDU comprises causing transmission of the at least one PDU comprising the header extension to the user plane function to facilitate removal of the header extension from the at least one PDU via the user plane function.

The apparatus of an example embodiment the causing transmission of the at least one PDU comprises causing transmission of the at least one PDU comprising the header extension to the user plane function to facilitate provision of the at least one PDU without the header extension to a user equipment. In an example embodiment, the handling request further comprises the protocol description for the PDU set.

In a further example embodiment, a non-transitory computer-readable storage medium is provided that includes program instructions stored thereon for, based on determining a protocol description indicating protocol data unit (PDU) set information related to extended reality data, causing transmission of a handling request for the PDU set that comprises at least a request for removal of a header extension related to the PDU set. The program instructions are further for, based on an indication that the header extension is removable by a user plane function of a core network, causing transmission of at least one PDU of the PDU set comprising the header extension.

In an example embodiment, the header extension is a real-time protocol (RTP) header extension. In an example embodiment, the protocol description comprises information regarding the header extension. In an example embodiment, the protocol description comprises information regarding at least one of the following: an application protocol, header type, and/or payload type. The program instructions for causing transmission of the handling request comprises causing transmission of the handling request to a policy control function of the core network.

The program instructions for causing transmission of the at least one PDU comprises causing transmission of the at least one PDU comprising the header extension to the user plane function to facilitate removal of the header extension from the at least one PDU via the user plane function.

The program instructions for causing transmission of the at least one PDU comprises causing transmission of the at least one PDU comprising the header extension to the user plane function to facilitate provision of the at least one PDU without header extension to a user equipment. In an example embodiment, the handling request further comprises the protocol description for the PDU set.

In yet another example embodiment, an apparatus is provided that includes means for, based on determining a protocol description indicating protocol description unit (PDU) set information related to extended reality data, causing transmission of a handling request for the PDU set that comprises at least a request for removal of a header extension related to the PDU set. The apparatus further comprises means for, based on an indication that the header extension is removable by a user plane function of a core network, causing transmission of at least one PDU of the PDU set comprising the header extension.

In an example embodiment, the header extension is a real-time protocol (RTP) header extension. In an example embodiment, the protocol description comprises information regarding the header extension. In an example embodiment, the protocol description comprises information regarding at least one of the following: an application protocol, header type, and/or payload type. The apparatus of an example embodiment the means for causing transmission of the handling request comprises causing transmission of the handling request to a policy control function of the core network.

The apparatus of an example embodiment the means for causing transmission of the at least one PDU comprises causing transmission of the at least one PDU comprising the header extension to the user plane function to facilitate removal of the header extension from the at least one PDU via the user plane function.

The apparatus of an example embodiment the means for causing transmission of the at least one PDU comprises causing transmission of the at least one PDU comprising the header extension to the user plane function to facilitate provision of the at least one PDU without the header extension to a user equipment. In an example embodiment, the handling request further comprises the protocol description for the PDU set.

In an example embodiment, a method is provided that includes receiving, from an application function of a core network, a handling request for a protocol data unit (PDU) set that comprises a protocol description and a request for removal of a header extension related to the PDU set. The method also includes determining, based on the protocol description, that a user plane function of the core network is capable of removing the header extension for the PDU set. The method further includes causing a rule indication to be provided to the user plane function for removal of the header extension related to the PDU set.

In an example embodiment, the header extension is a real-time protocol (RTP) header extension. The method of an example embodiment further comprising transmitting a response towards the application function based on the determination that the user plane function is capable of removing the header extension related to the PDU set. In an example embodiment, the protocol description comprises information regarding the header extension. In an example embodiment, the protocol description comprises information regarding at least one of the following: application protocol, header type, and/or payload type.

In another example embodiment, an apparatus is provided that includes at least one processor and at least one memory storing instructions, that, when executed by the at least one processor, cause the apparatus to receive, from an application function of a core network, a handling request for a protocol data unit (PDU) set that comprises a protocol description and a request for removal of a header extension related to the PDU set. The apparatus is also caused to determine, based on the protocol description, that a user plane function of the core network is capable of removing the header extension for the PDU set. The apparatus is further caused to cause a rule indication to be provided to the user plane function for removal of the header extension related to the PDU set.

In an example embodiment, the header extension is a real-time protocol (RTP) header extension. The apparatus of an example embodiment the instructions, when executed by that least one processor, further cause the apparatus to transmit a response towards the application function based on the determination that the user plane function is capable of removing the header extension related to the PDU set. In an example embodiment, the protocol description comprises information regarding the header extension. In an example embodiment, the protocol description comprises information regarding at least one of the following: application protocol, header type, and/or payload type.

In a further embodiment, a non-transitory computer-readable storage medium is provided that includes program instructions stored thereon for receiving, from an application function of a core network, a handling request for a protocol data unit (PDU) set that comprises a protocol description and a request for removal of a header extension related to the PDU set. The program instructions are also for determining, based on the protocol description, that a user plane function of the core network is capable of removing the header extension for the PDU set. The instructions are further for causing a rule indication to be provided to the user plane function for removal of the header extension related to the PDU set.

In an example embodiment, the header extension is a real-time protocol (RTP) header extension. The program instructions of an example embodiment are further configured for transmitting a response towards the application function based on the determination that the user plane function is capable of removing the header extension related to the PDU set. In an example embodiment, the protocol description comprises information regarding the header extension. In an example embodiment, protocol description comprises information regarding at least one of the following: application protocol, header type, and/or payload type.

In yet another example embodiment, an apparatus is provided that includes means for receiving, from an application function of a core network, a handling request for a protocol data unit (PDU) set that comprises a protocol description and a request for removal of a header extension related to the PDU set. The apparatus also includes means for determining, based on the protocol description, that a user plane function of the core network is capable of removing the header extension for the PDU set. The apparatus further comprises means for causing a rule indication to be provided to the user plane function for removal of the header extension related to the PDU set.

In an example embodiment, the header extension is a real-time protocol (RTP) header extension. The apparatus of an example embodiment further comprises means for transmitting a response towards the application function based on the determination that the user plane function is capable of removing the header extension related to the PDU set. In an example embodiment, the protocol description comprises information regarding the header extension. In an example embodiment, the protocol description comprises information regarding at least one of the following: application protocol, header type, and/or payload type.

In an example embodiment, a method is provided that includes receiving an indication from a policy control function of a core network for removal of a header extension for a protocol data unit (PDU) set. The method also includes receiving at least one PDU of the PDU set comprising the header extension from an application function. The method further includes, in response to receiving the at least one PDU, causing removal of the header extension from the at least one PDU and adjusting one or more parameters for the at least one PDU.

In an example embodiment, the header extension is a real-time protocol (RTP) header extension. The method of an example embodiment further includes determining at least one PDU set parameter for the PDU set based on the header extension and causing the removal of the header extension from the PDU based on the at least one PDU set parameter. In this example embodiment, the method further includes adding a GPRS tunneling protocol-user plane header extension comprising the at least one PDU set parameter to a GPRS tunneling protocol-user plane header of the PDU. In this example embodiment, the method further includes transmitting the at least one PDU to at least one radio access network.

In another example embodiment, an apparatus is provided that includes at least one processor and at least one memory storing instructions, that, when executed by the at least one processor, cause the apparatus to receive an indication from a policy control function of a core network for removal of a header extension for a protocol data unit (PDU) set. The apparatus is also caused to receive at least one PDU of the PDU set comprising the header extension from an application function. The apparatus is further caused to, in response to receiving the at least one PDU, cause removal of the header extension from the at least one PDU and adjust one or more parameters for the at least one PDU.

In an example embodiment, the header extension is a real-time protocol (RTP) header extension. The apparatus of an example embodiment, when executed by the at least one processor, further cause the apparatus to determine at least one PDU set parameter for the PDU set based on the header extension and cause the removal of the header extension from the PDU based on the at least one PDU set parameter. The apparatus of this example embodiment, when executed by the at least one processor, further cause the apparatus to add a GPRS tunneling protocol-user plane header extension comprising the at least one PDU set parameter to a GPRS tunneling protocol-user plane header of the PDU. The apparatus of this example embodiment, when executed by the at least one processor, further cause the apparatus to transmit the at least one PDU to at least one radio access network.

In a further example embodiment, a non-transitory computer-readable storage medium is provided that includes program instructions stored thereon for receiving an indication from a policy control function of a core network for removal of a header extension for a protocol data unit (PDU) set. The program instructions are also for receiving at least one PDU of the PDU set comprising the header extension from an application function. The program instruction are further for, in response to receiving the at least one PDU, causing removal of the header extension from the at least one PDU and adjusting one or more parameter for the at least one PDU.

In an example embodiment, the header extension is a real-time protocol (RTP) header extension. The instructions of an example embodiment are further configured for determining at least one PDU set parameter for the PDU set based on the header extension and causing the removal of the header extension from the PDU based on the at least one PDU set parameter. In this example embodiment, the instructions are further configured for adding a GPRS tunneling protocol-user plane header extension comprising the at least one PDU set parameter to a GPRS tunneling protocol-user plane header of the PDU. In this example embodiment, the instructions are further configured for transmitting the at least one PDU to at least one radio access network.

In yet another example embodiment, an apparatus is provided that includes means for receiving an indication from a policy control function of a core network for removal of a header extension for a protocol data unit (PDU) set. The apparatus also includes means for receiving at least one PDU of the PDU set comprising the header extension from an application function. The apparatus further includes means for, in response to receiving the at least one PDU, causing removal of the header extension from the at least one PDU and means for adjusting one or more parameters for the at least one PDU.

In an example embodiment, the header extension is a real-time protocol (RTP) header extension. The apparatus of an example embodiment further includes means for determining at least one PDU set parameter for the PDU set based on the header extension and means for causing the removal of the header extension from the PDU based on the at least one PDU set parameter. In this example embodiment, the apparatus further includes means for adding a GPRS tunneling protocol-user plane header extension comprising the at least one PDU set parameter to a GPRS tunneling protocol-user plane header of the PDU. In this example embodiment, the apparatus further includes means for transmitting the at least one PDU to at least one radio access network.

In an example embodiment, a method is provided that includes receiving, from a system management function of a core network, a quality of service (QoS) rule comprising an indication for removal of a header extension for a protocol data unit (PDU) set. The method also includes receiving at least one PDU of the PDU set comprising a header extension from an application. The method also includes, in response to receiving the at least one PDU, causing removal of the header extension from the at least one PDU and adjusting one or more parameters for the at least one PDU. The method further includes causing transmission of the at least one PDU without the header extension to at least one radio access network.

In an example embodiment, the header extension is a real-time protocol (RTP) header extension. In an example embodiment, the causing transmission of the at least one PDU comprises causing transmission of the at least one PDU without the header extension to a user plane function via the radio access network.

In another example embodiment, an apparatus is provided that includes at least one processor and at least one memory storing instructions, that, when executed by the at least one processor, cause the apparatus to receive, from a system management function of a core network, a quality of service (QoS) rule comprising an indication for removal of a header extension for a protocol data unit (PDU) set. The apparatus is also configured to receive at least one PDU of the PDU set comprising a header extension from an application. The apparatus is also configured to, in response to receiving the at least one PDU, cause removal of the header extension from the at least one PDU and adjust one or more parameters for the at least one PDU. The apparatus is further caused to cause transmission of the at least one PDU without the header extension to at least one radio access network.

In an example embodiment, the header extension is a real-time protocol (RTP) header extension. In an example embodiment, the causing transmission of the at least one PDU comprises causing transmission of the at least one PDU without the header extension to a user plane function via the radio access network.

In a further example embodiment, a non-transitory computer-readable storage medium is provided that includes program instructions stored thereon for receiving, from a system management function of a core network, a quality of service (QoS) rule comprising an indication for removal of a header extension for a protocol data unit (PDU) set. The program instructions are also for receiving at least one PDU of the PDU set comprising a header extension from an application. The instructions are also for, in response to receiving the at least one PDU, causing removal of the header extension from the at least one PDU and adjusting one or more parameters for the at least one PDU. The apparatus is further for causing transmission of the at least one PDU without the header extension to at least one radio access network.

In an example embodiment, the header extension is a real-time protocol (RTP) header extension. In an example embodiment, the causing transmission of the at least one PDU comprises causing transmission of the at least one PDU without the header extension to a user plane function via the radio access network.

In yet another example embodiment, an apparatus is provided that includes means for receiving, from a system management function of a core network, a quality of service (QoS) rule comprising an indication for removal of a header extension for a protocol data unit (PDU) set. The apparatus also includes means for receiving at least one PDU of the PDU set comprising a header extension from an application. The apparatus also includes means for, in response to receiving the at least one PDU, causing removal of the header extension from the at least one PDU and means for adjusting one or more parameters for the at least one PDU. The apparatus further includes means for causing transmission of the at least one PDU without the header extension to at least one radio access network.

In an example embodiment, the header extension is a real-time protocol (RTP) header extension. In an example embodiment, the causing transmission of the at least one PDU comprises causing transmission of the at least one PDU without the header extension to a user plane function via the radio access network.

The above summary is provided merely for purposes of summarizing some example embodiments to provide a basic understanding of some aspects of the subject disclosure. Accordingly, it will be appreciated that the above-described example embodiments are merely examples and should not be construed to narrow the scope or spirit of the subject disclosure in any way. It will be appreciated that the scope of the disclosure encompasses many potential example embodiments in addition to those here summarized, some of which will be further described below. Other features, aspects, and advantages of the subject disclosure will become apparent from the description, the drawings, and/or the claims.

BRIEF DESCRIPTION OF THE DRAWINGS

Figure 1:
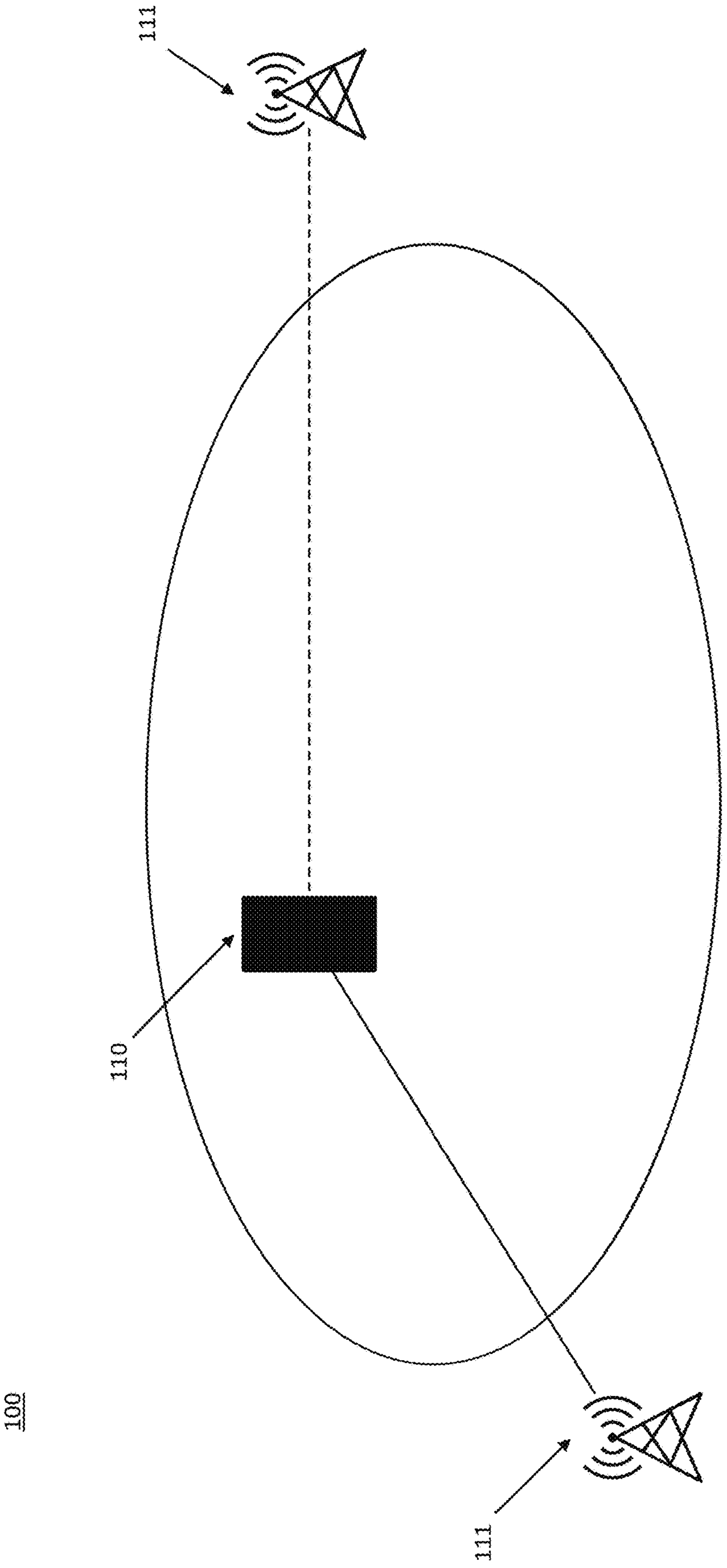
Figure 2:
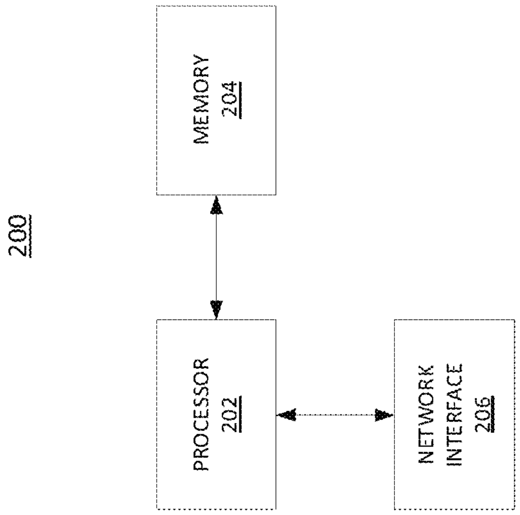
Figure 3:
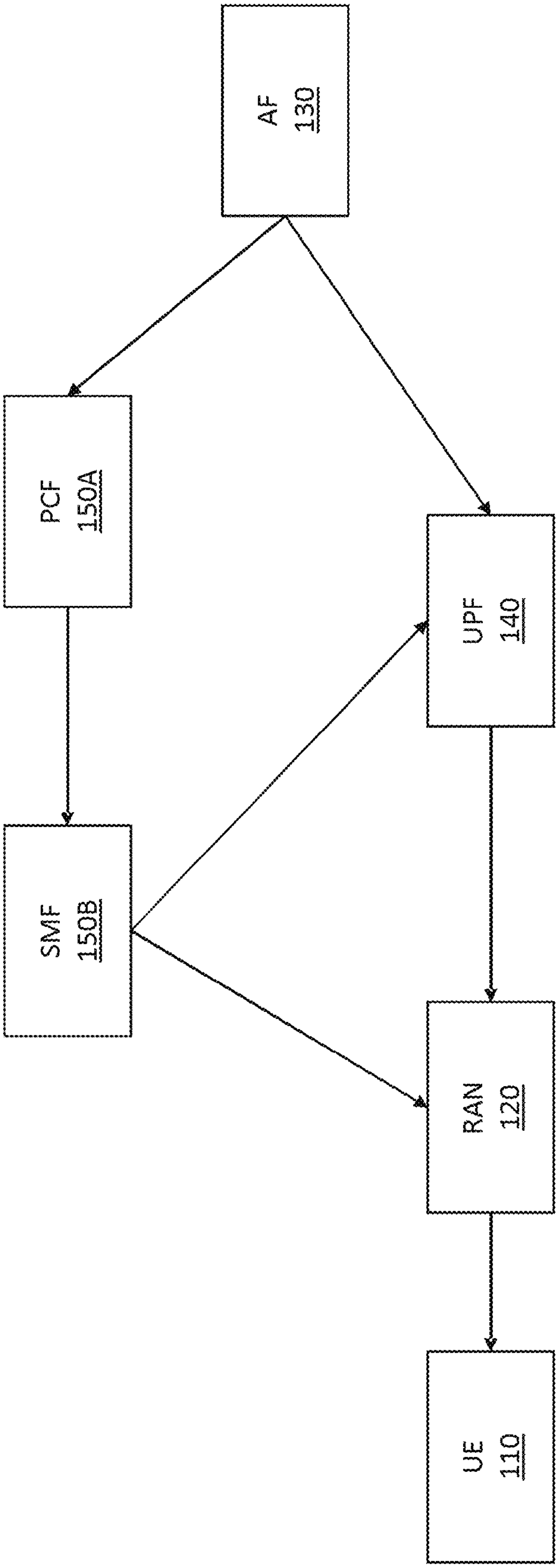
Figure 4A:
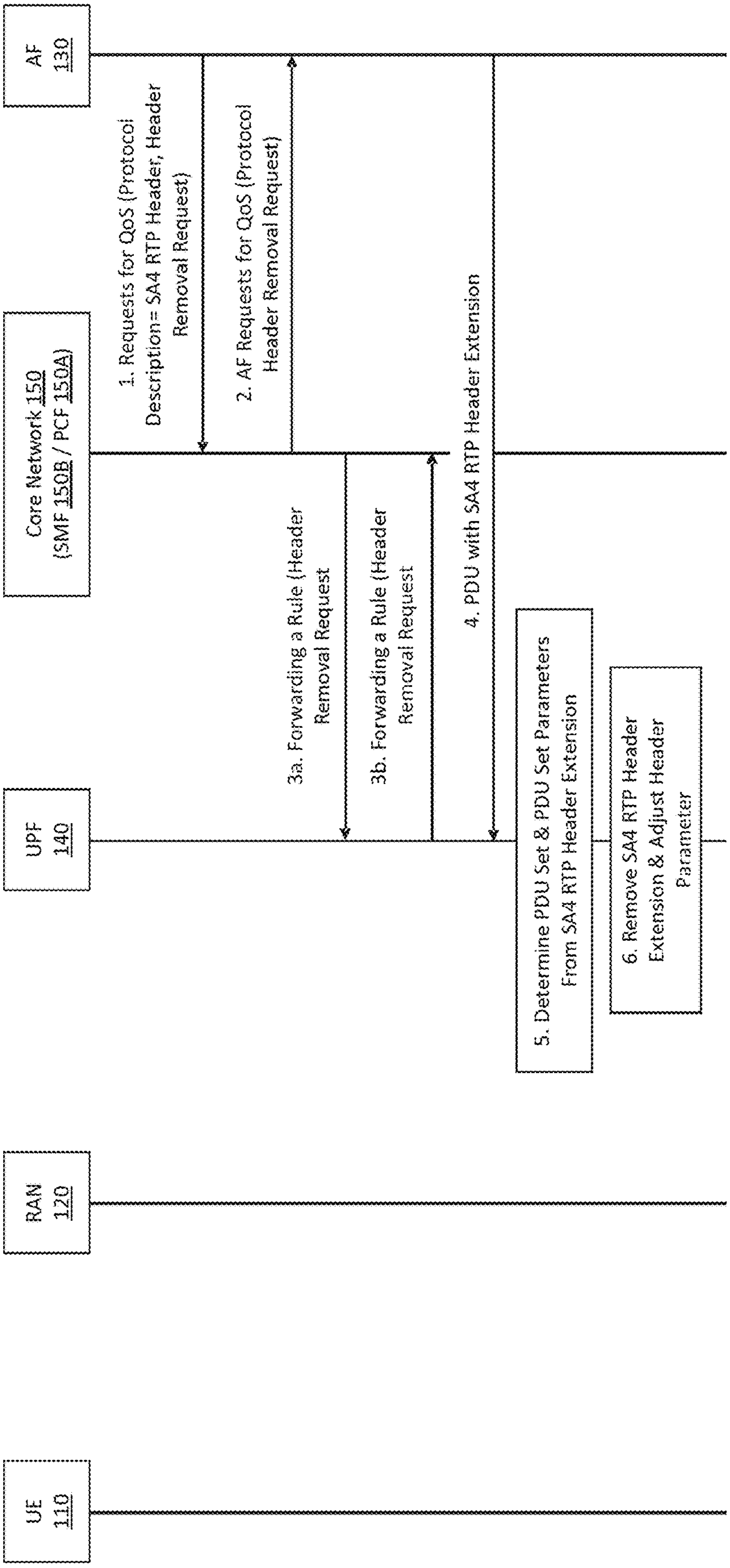
Figure 4B:
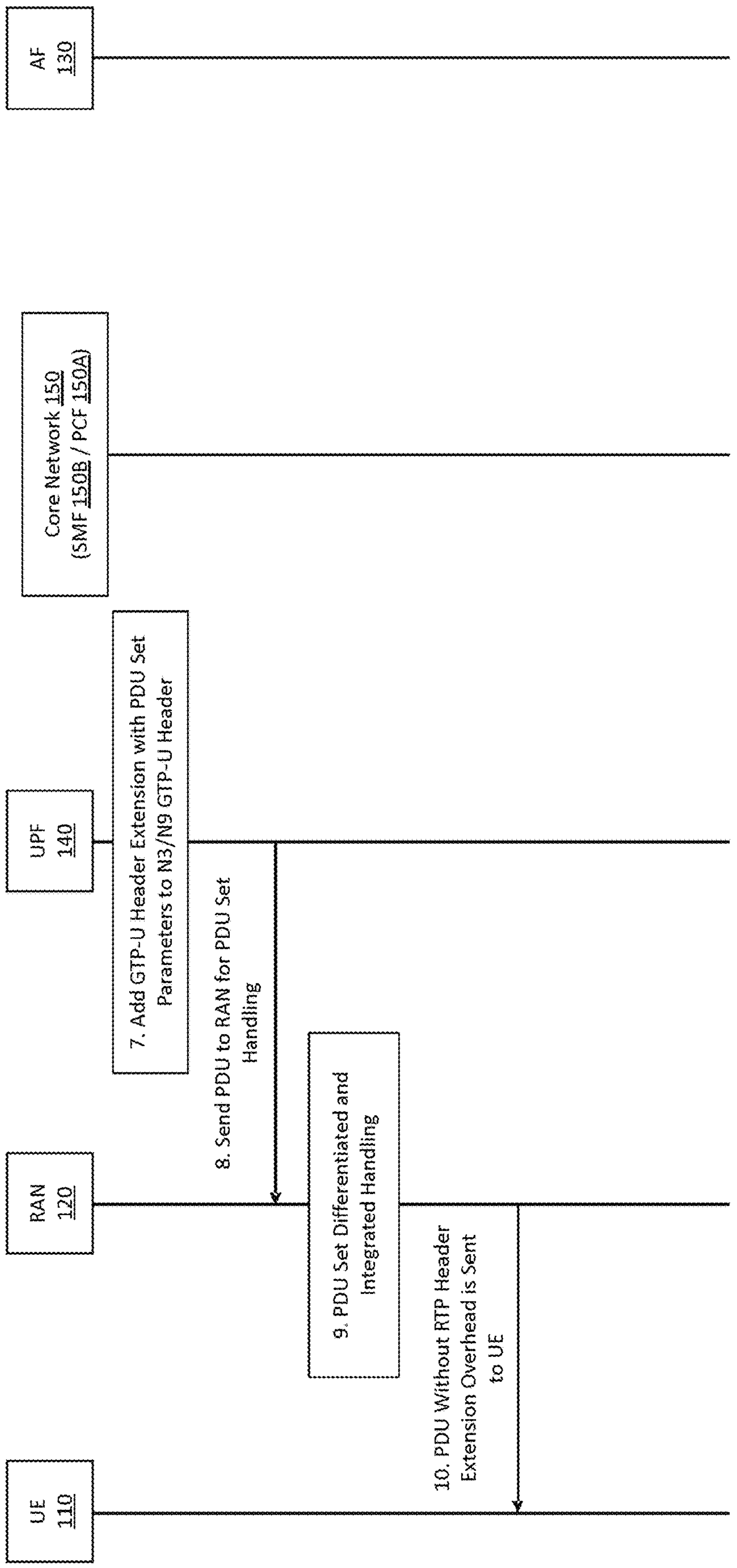
Figure 5A:
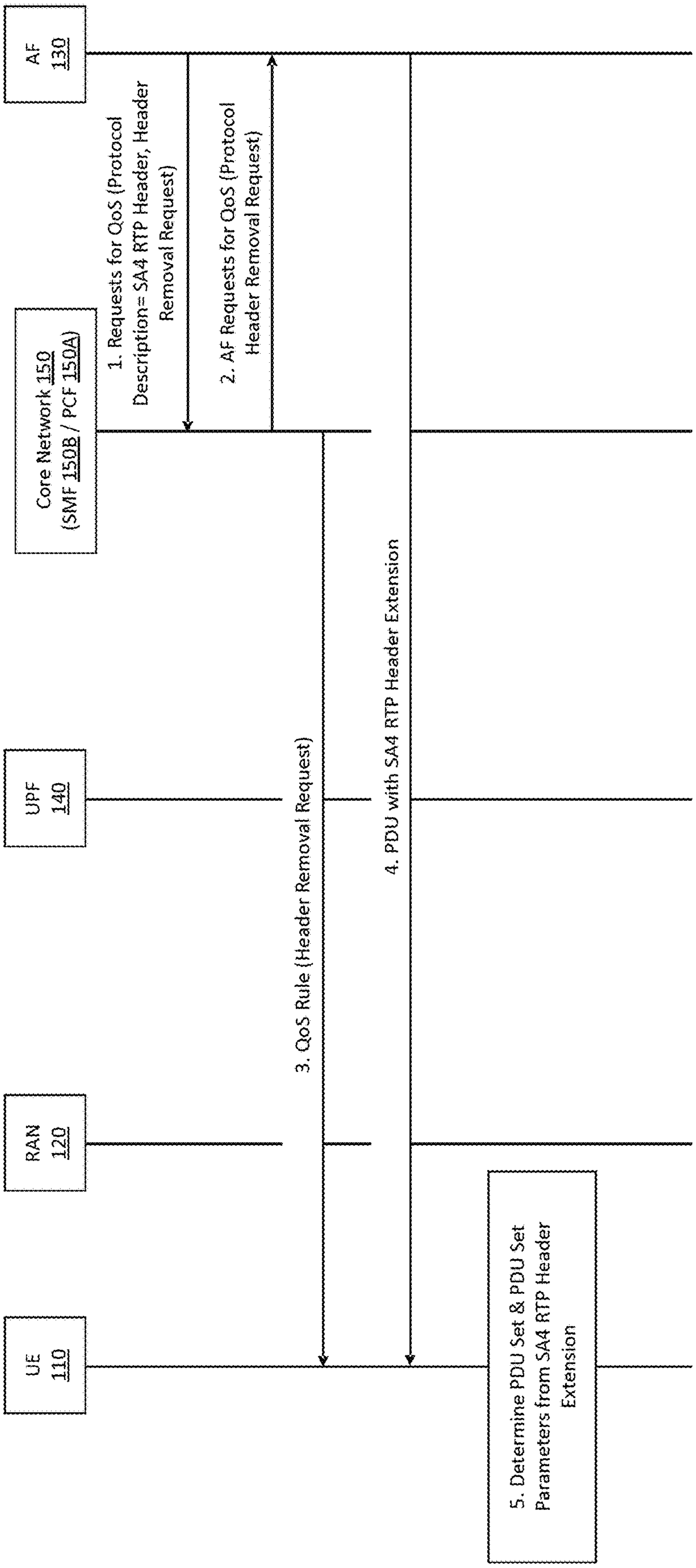
Figure 5B:
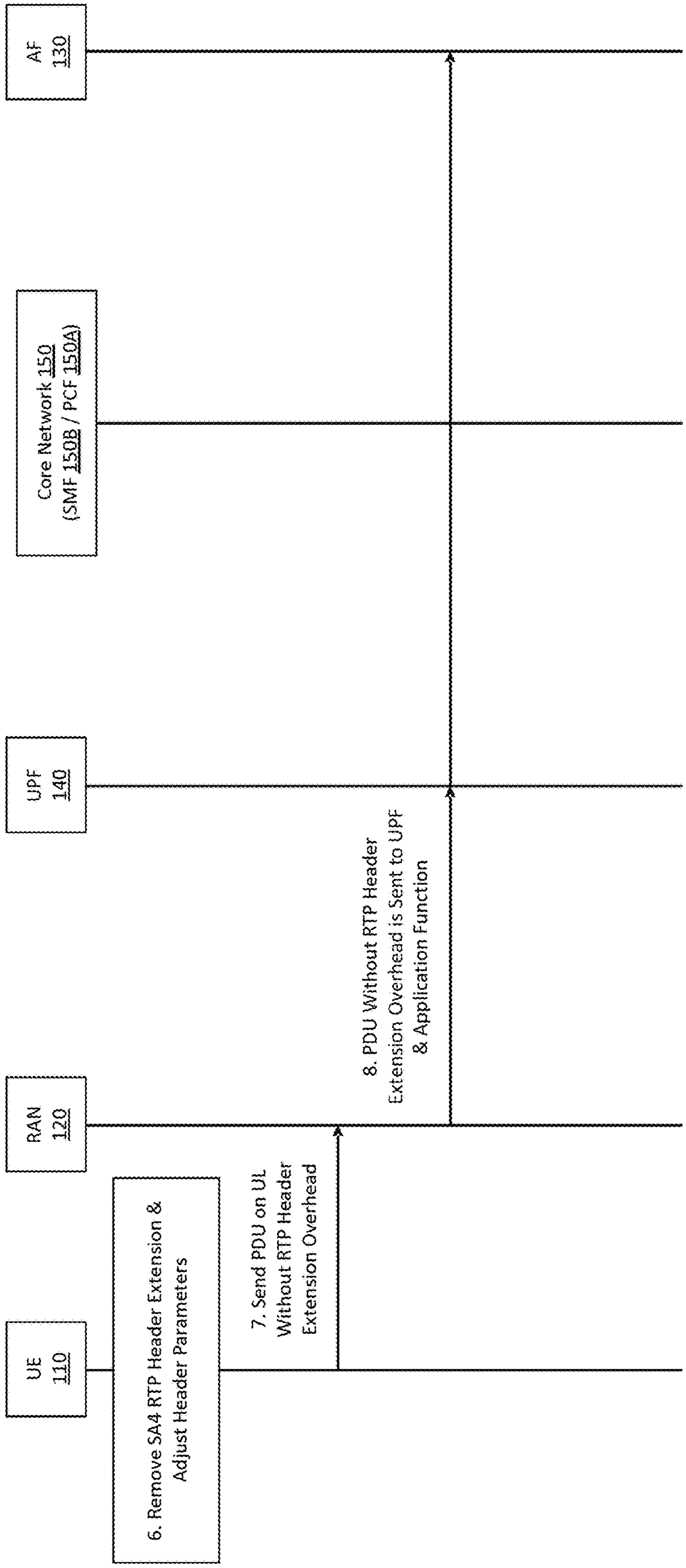
Figure 6:
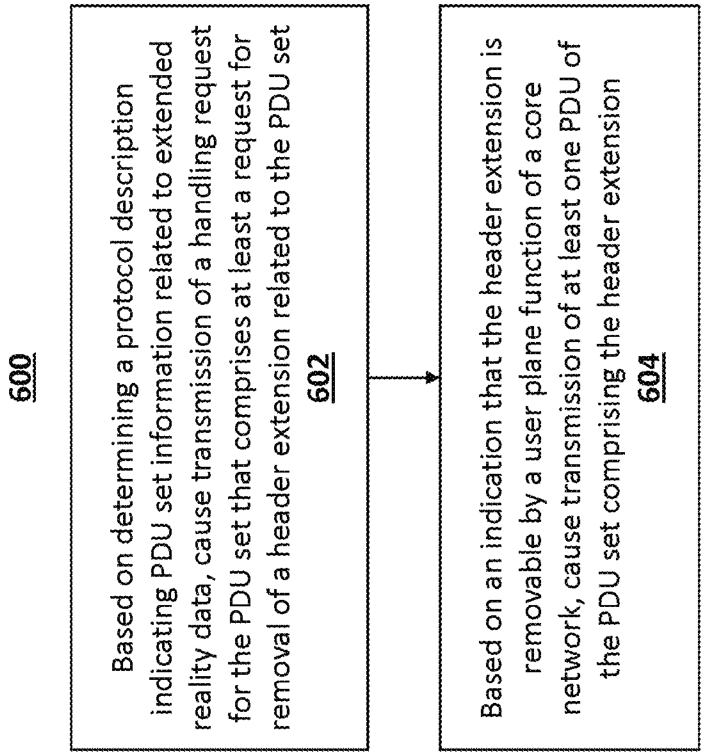
Figure 7:
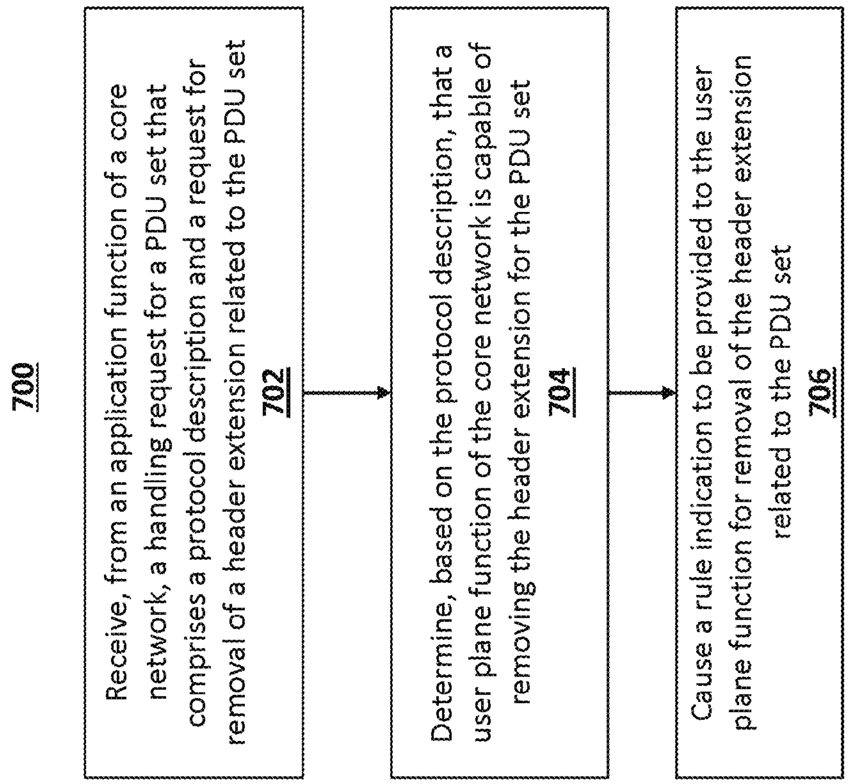
Figure 8:
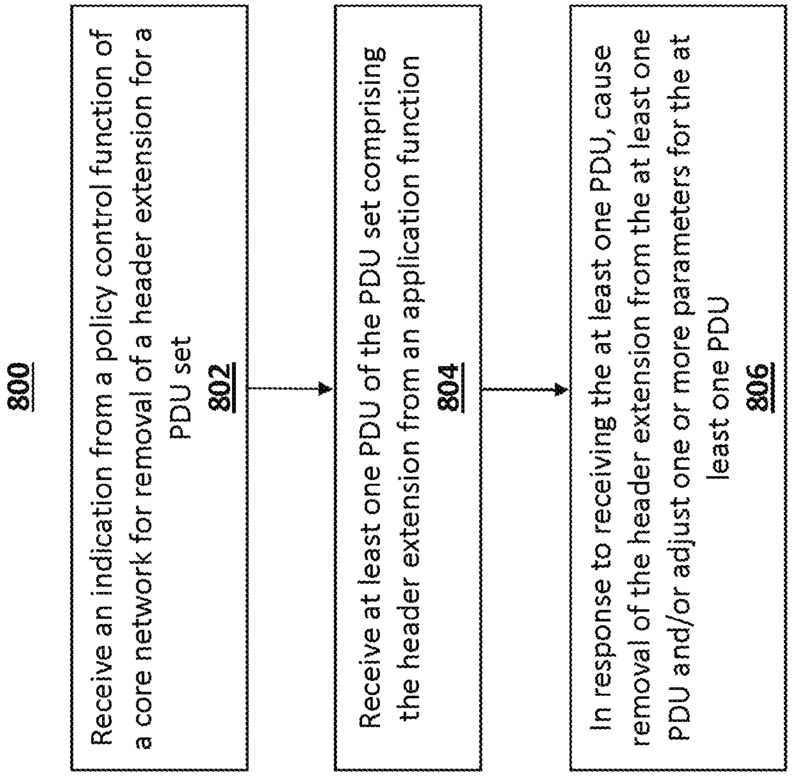
Figure 9:
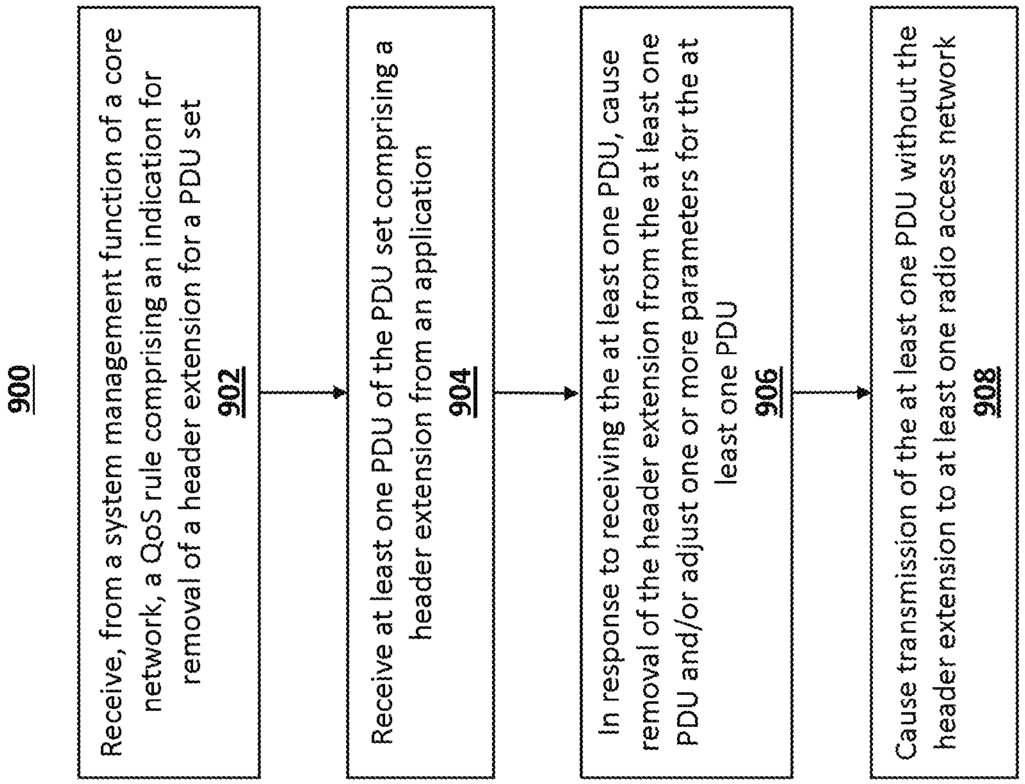

Having thus described certain example embodiments of the subject disclosure in general terms, reference will hereinafter be made to the accompanying drawings, which are not drawn to scale, and wherein:

FIG. 1 illustrates an example of a communication system in accordance with an example embodiment of the subject disclosure;

FIG. 2 illustrates a block diagram of an apparatus that may be configured in accordance with an example embodiment of the subject disclosure;

FIG. 3 illustrates a block diagram of an example architecture for protocol data unit set handling for extended reality in accordance with various example embodiments of the subject disclosure;

FIG. 4A illustrates a signal diagram in a downlink configuration of the operations in accordance with an example embodiment of the subject disclosure;

FIG. 4B illustrates a signal diagram in a downlink configuration of the operations in accordance with an example embodiment of the subject disclosure;

FIG. 5A illustrates a signal diagram in an uplink configuration of the operations in accordance with an example embodiment of the subject disclosure;

FIG. 5B illustrates a signal diagram in an uplink configuration of the operations in accordance with an example embodiment of the subject disclosure;

FIG. 6 illustrates an example workflow implemented by an application function in accordance with an example embodiment of the subject disclosure;

FIG. 7 illustrates an example workflow implemented by a core network comprising a policy control function in accordance with an example embodiment of the subject disclosure;

FIG. 8 illustrates an example workflow implemented by a user plane function in accordance with an example embodiment of the subject disclosure; and FIG. 9 illustrates an example workflow implemented by a user equipment in accordance with an example embodiment of the subject disclosure.

DETAILED DESCRIPTION

Some example embodiments of the subject disclosure will now be described more fully hereinafter with reference to the accompanying drawings, in which some, but not all, example embodiments are shown. Indeed, various example embodiments of the subject disclosure may be embodied in many different forms and should not be construed as limited to the example embodiments set forth herein; rather, these example embodiments are provided so that the subject disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with example embodiments of the subject disclosure. Thus, use of any such terms should not be taken to limit the spirit and scope of example embodiments of the subject disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The phrases "in one embodiment," "in one example embodiment," "according to one embodiment," "according to one example embodiment," "in some embodiments," "in some example embodiments," "in various embodiments", "in various example embodiments," and the like generally refer to the fact that the particular feature, structure, or characteristic following the phrase may be included in at least one example embodiment of the subject disclosure, but not necessarily all example embodiments of the subject disclosure. Thus, the particular feature, structure, or characteristic may be included in more than one example embodiment of the subject disclosure such that these phrases do not necessarily refer to the same example embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some example embodiments, or it may be excluded.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like. The term "non-transitory", as used herein, is a limitation of the medium itself (e.g., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where a list of two or more elements are joined by "and", "or", or "and/or", means at least any one of the elements, or at least any two or more of the elements, or at least all of the elements.

Example embodiments will be illustrated herein in conjunction with example communication systems and associated techniques for optimizing configuration of extension headers for protocol data units of a communication system. It should be understood, however, that the scope of the claims is not limited to particular types of communication systems and/or processes disclosed. Example embodiments can be implemented in a network (e.g., a core network) or a terminal device (e.g., a user equipment) of a communication system, using one or more processes and operations. For example, although illustrated in the context of wireless cellular systems utilizing 3GPP system elements such as a 3GPP next generation core network, the disclosed example embodiments can be adapted in a straightforward manner to a variety of other types of communication systems. Additionally, while the subject disclosure may describe various example embodiments in conjunction with a fifth generation (5G) communications system, the subject disclosure also applies to and comprises other networks and network technologies, such as 3G, 4G, Long Term Evolution (LTE), sixth generation (6G), etc. without limitation.

In accordance with illustrative example embodiments implemented in a 5G communication system environment, one or more 3GPP technical specifications (TS) and technical reports (TR) provide further explanation of user equipment and core network elements/entities/functions and/or operations performed by the user equipment and the core network elements/entities/functions, e.g., 3GPP TS 23.700-60, 3GPP TS 23.501, 3GPP TS 23.502, and/or 3GPP TS 23.503. Other 3GPP TS/TR documents provide other conventional details that one of ordinary skill in the art will realize. However, while example embodiments are well-suited for implementation associated with the above-mentioned 3GPP standards for 5G, alternative embodiments are not necessarily intended to be limited to any particular standards.

As illustrated in FIG. 1, a communication system 100 is provided in accordance with various example embodiments of the subject disclosure. In one or more example embodiments, the communication system 100 can include one or more terminal devices (e.g., user equipment) and one or more networks (e.g., one or more communication networks). In various example embodiments, the communication system 100 is an environment that includes or corresponds to a 5G communication system (e.g., a 5G communication network) associated with one or more terminal devices (e.g., user equipment) and/or one or more networks (e.g., one or more communication networks) that support 5G communications. However, the depiction of communication system 100 in FIG. 1 is not intended to limit or otherwise confine the example embodiments described and contemplated herein to any particular configuration of elements or networks, nor is it intended to exclude any alternative configurations or systems for the set of configurations and systems that can be used in connection with embodiments of the subject disclosure. Rather, FIG. 1, and the communication system 100 disclosed therein is merely presented to provide an example basis and context for the facilitation of describing some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components In some example embodiments, the communication system 100 may comprise at least one user equipment (UE) 110 and at least one network component 111 that are capable of being in communication with each other and to receive uplink (UL) and/or downlink (DL) transmissions. The at least one network component 111 can be a radio access network (RAN) component, a core network (CN) component, a data network (DN) component, an application server component, an application function, and/or another type of network component. In one or more example embodiments, the at least one network component 111, may be a network element and may be embodied by any of a variety of access points including, for example, a Node B, e.g., a gNB, or the like. The UEs 110 may be configured to operate in two or more frequency bands, such as three or four frequency bands in some example embodiments. With respect to at least some, but not necessarily all, of the frequency bands, the UE 110 and/or the least one network component 111 may be configured to remove a header extension (e.g., real-time protocol (RTP) header extension) associated with a protocol data unit (PDU). Typically, a RTP header extension may utilized for XR and may be included between an application client and application server (e2e) when the RTP header is to be utilized between an endpoint and the 5GS. However, inclusion of an RTP header extension in a PDU and/or PDU set may waste resources (especially on the air-interface) and may further cause fragmentation of PDUs on N6 because the extra overhead causes the PDU to exceed the maximum packet size (typically 1500 bytes for Ethernet). Additionally, RTP is traditionally utilized for an e2e protocol. Accordingly, in various example embodiments disclosed herein, inclusion of an RTP header extension in a PDU and/or PDU set may be negotiated between an endpoint and the 5GS. Additionally, in various example embodiments disclosed herein, the RTP header extension is not sent e2e, but rather removed by the 5GS (UE or user plane function (UPF)) when a PDU containing the header extension is received. By negotiating inclusion of an RTP header extension in a PDU and/or PDU set, utilization of network resources (e.g., air-interface resources) may be optimized and/or fragmentation of PDUs on N6 may be mitigated. For example, the RTP header extension removal may be utilized to remove information that is not needed by the application and/or to avoid packet fragmentation in tunnels between a RAN and a UPF.

As described below, the apparatus, method and computer program product of an example embodiment are configured to implement a removal of a header extension to reduce bandwidth of data transmitted via the communication system 100, remove unneeded bits for transmissions related to the communication system 100, and/or mitigate packet fragmentation during transmission of data via the communication system 100.

By way of example, the communication system 100 may be deployed within a radio access architecture based on long term evolution advanced (LTE Advanced, LTE-A) and/or new radio (NR, 5G). However, the system may be deployed in other network architectures including within other communication networks including, for example, other communication networks developed in the future, e.g., 6G networks, as well as any of a number of existing networks including a universal mobile telecommunication system (UMTS), radio access network (UTRAN or E-UTRAN), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The UE 110 may be any type of user terminal, terminal device, etc. to which resources on the air interface are allocated and assigned. For example, the UEs may be a portable computing device such as a wireless mobile communication device including, but not limited to, the following types of devices: a mobile station (mobile phone), smartphone, a virtual reality device, an augmented reality device, personal digital assistant (PDA), handset, device using a wireless modem (alarm or measurement device, etc.), laptop and/or touch screen computer, tablet, game console, notebook, and multimedia device. The user equipment may also be called a subscriber unit, mobile station, remote terminal, access terminal, or user terminal just to mention but a few names or apparatuses.

In some example embodiments, the at least one network component 111 can be related to one or more cellular access points. In some example embodiments, the at least one network component 111 may define and/or service one or more cells. In one or more example embodiments, one or more access points may be in communication with a network, such as a core network via a gateway, such that the one or more access points establish cellular radio access networks by which the UE 102 may communicate with the at least one network component 111.

Although not shown, the communication system 100 may also include a controller associated with one or more of the access points, such as, base stations, for example, so as to facilitate operation of the access points and management of the UE 102 in communication therewith. As shown in FIG. 1, the communication system 100 may also include one or more wireless local area networks (WLANs), each of which may be serviced by a WLAN access point configured to establish wireless communications with the UE 102. As such, the UE 102 may communicate with the at least one network component 111 via a WLAN access point. In various example embodiments, the at least one network component 111 may consist of additional network elements as routers, switches, servers, gateways, and/or controllers to facilitate communication with the UE 102.

In some example embodiments, the communication system 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some example embodiments, the communications network 100 can comprise or employ massive Multiple Input and Multiple Output (massive MIMO) antennas. In some example embodiments, the communication system 100 can comprise multi-user MIMO (MU-MIMO) antennas. In some example embodiments, the communication system 100 can employ edge computing whereby the computing servers are communicatively, physically, computationally, and/or temporally closer to the communications device (e.g., UE 102) in order to reduce latency and data traffic congestion. In some example embodiments, the communication system 100 can employ other technologies, devices, or techniques, such as small cell, low-powered RAN, beamforming of radio waves, WIFI-cellular convergence, Non-Orthogonal Multiple Access (NOMA), channel coding, and the like.

Referring now to FIG. 2, an example apparatus 200 is provided. The apparatus 200 may be an embodiment of a UE 110, a RAN component 120, an application function (AF) 130, a user plane function (UPF) 140, a policy control function (PCF) 150A, and/or a session management function (SMF) 150B as illustrated in FIG. 3. In one or more example embodiments, the AF 130, the UPF 140, and/or the PCF 150A may be integrated within a core network in communication with or otherwise associated with a UE 110. Alternatively, the apparatus 200 may be an embodiment of another type of network element or may be embodied by or otherwise associated with another type of network element such as, for example, an access point.

The apparatus 200 includes processor 202, memory 204, and/or network interface 206. The apparatus 200 may be configured to execute one or more of the operations described herein. Although these components are described with respect to the performance of various functions, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some example embodiments, the processor 202 (and/or co-processor or any other processing circuitry assisting or otherwise associated with the processor) may be in communication with the memory 204 via a bus for passing information among components of the apparatus 200. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with an example embodiment disclosed herein.

The processor 202 may be embodied in a number of different ways and may, for example, include one or more processing devices configured to perform independently. In some non-limiting embodiments, the processor 202 may include one or more processors configured in tandem via a bus to enable independent execution of instructions, pipelining, and/or multithreading. The use of the term "processor" may be understood to include a single core processor, a multi-core processor, multiple processors internal to the apparatus 200, and/or remote or "cloud" processors.

In some example embodiments, the processor 202 may be configured to execute instructions stored in the memory 204 and/or circuitry otherwise accessible to the processor 202. In some example embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some example embodiments, the apparatus 200 may optionally include input/output circuitry that may, in turn, be in communication with processor 202 to provide output to a user and/or other entity and, in some example embodiments, to receive an indication of an input. The input/output circuitry may comprise a user interface and may include a display, and may comprise a web user interface, a mobile application, a query-initiating computing device, a kiosk, or the like. In some example embodiments, the input/output circuitry may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The network interface 206 may be any means such as a device or circuitry embodied in either hardware or a combination of hardware and software that is configured to receive and/or transmit data from/to a network, e.g., one or more of the RAN component 120 and/or any other device, circuitry, or module in communication with the apparatus 200. In this regard, the network interface 206 may include, for example, a network interface for enabling communications with a wired or wireless communication network. For example, the network interface 206 may include one or more network interface cards, antennae, buses, switches, routers, modems, and supporting hardware and/or software, or any other device suitable for enabling communications via a network. Additionally, or alternatively, the network interface 206 may include the circuitry for interacting with the antenna/antennae to cause transmission of signals via the antenna/antennae or to handle receipt of signals received via the antenna/antennae.

It should be appreciated that the embodiments described herein are not restricted to the system that is given as an example, such as a 5G system, and that a person skilled in the art may apply the solution to other communication systems including 6G or other communication systems being developed or to be developed in the future. Additionally, although some embodiments described herein in the context of a base station, the method may be performed by other types of network entities in accordance with other example embodiments.

FIG. 3 illustrates an example architecture for PDU set handling for extended reality (XR) in the 5G devices in accordance with an example embodiment of the subject disclosure. In various example embodiments, the PDU set may comprise one or more PDUs configured to carry a payload of one unit of information generated at an application level (e.g., a video frame, video slice for XR service, etc.). As shown, the architecture may comprise the UE 110, the RAN 120, the AF 130, the UPF 140, the PCF 150A, and/or the SMF 150B.

In one or more example embodiments, the UE 102 is in operable communication with the RAN 120, such as by way of a transmission tower, a base station, an access point, a network node, and/or the like. In some example embodiments, the RAN 120 can communicate with the UPF 140, the SMF 150B, or a component or entity thereof. In some example embodiments, the AF 130, the UPF 140, the PCF 150A, and/or the SMF 150B can be included in a core network that facilitates communication with the UE 102, such as for sending data, messages, requests, and/or the like. In some example embodiments, the UE 102 can connect to the RAN 120, which can then relay the communications between the UE 102 and one or more portions of the core network such as, for example, the AF 130, the UPF 140, the PCF 150A, and/or the SMF 150B. In other example embodiments, the core network may further include a network exposure function (NEF) and/or one or more additional network functions (e.g., Network Slice Selection Function (NSSF), Unified Data Repository (UDR), etc.) that may assist in communication between an application and a user equipment. For instance, in some example embodiments, the core network may additionally or alternatively include one or more of the following network functions: NEF, NSSF, UDR, Authentication Server Function (AUSF), Access and Mobility Management Function (AMF), Data Network (DN), e.g. operator services, Internet access or 3rd party services, Unstructured Data Storage Function (UDSF), Network Repository Function (NRF), Unified Data Management (UDM), User Plane Function (UPF), UE radio Capability Management Function (UCMF), Network Data Analytics Function (NWDAF), and/or Charging Function (CHF). The system environment may further comprise the following network entities: Service Communication Proxy (SCP) and Security Edge Protection Proxy (SEPP). In some example embodiments, the SMF 150B can be in direct communication with the UPF 140.

In some example embodiments, the UE 102 can comprise a single-mode or a dual-mode device such that the UE 102 can be connected to the RAN 120. In some example embodiments, the RAN 120 can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used to connect the UE 102 to the core network. In some example embodiments, the RAN 120 can comprise or be implemented using a chip, such as a silicon chip, in the UE 102 that can be paired with or otherwise recognized by a similar chip in the core network, such that the RAN 120 can establish a connection or line of communication between the UE 102 and the core network by identifying and pairing the chip within the UE 102 with the chip within the core network. In some example embodiments, the RAN 120 can implement one or more base stations, towers or the like to communicate between the UE 102 and the AF 130, the UPF 140, the PCF 150A, and/or the SMF 150B of the core network.

In some example embodiments, the UE 102 can be configured to communicate with the RAN 120 in a N1 interface, e.g., according to a non-access stratum (NAS) protocol. In some example embodiments, RAN 120 can be configured to communicate with the AF 130, the PCF 150A, and/or the SMF 150B of the core network in a N2 interface (e.g., in a control plane between a base station of the RAN 120 and the AF 130, the PCF 150A, and/or the SMF 150B of the core network). In some example embodiments, the RAN 120 can be configured to communicate with the UPF 140 in a N3 interface, e.g., in a user plane. In some example embodiments, the AF 130, the UPF 140, the PCF 150A, and/or the SMF 150B of the core network can be configured to communicate with other services or network entities within the core network in various different interfaces and/or according to various different protocols. In one or more example embodiments, the SMF 150B can be configured to communicate with the UPF 140 in a N4 interface, which can act as a bridge between the control plane and the user plane, such as acting as a conduit for a PDU session during which one or more PDUs and/or one or more PDU sets are transmitted between the UE 102, the RAN 120, the AF 130, the UPF 140, the PCF 150A, the SMF 150B, and/or or components/services thereof.

In one or more example embodiments, the AF 130 may be configured to transmit one or more handling requests to the at least one PCF 150A. In various example embodiments, the handling request may include an initiation of a PDU session that may be used to provide end-to-end user plane connectivity between a UE and a specific data network (DN) through a user plane function (UPF). The PDU session may support one or more quality of service (QoS) flows. In various example embodiments, a one-to-one mapping is provided between a QoS flow and quality of service profile. In various example embodiments, a PDU set comprises one or more PDUs carrying a payload of one unit of information generated at the application level (e.g., a frame, a video slice for XRM services, etc., as used in 3GPP TS23.501). In various example embodiments, a PDU QoS set may additionally contain parameters, which are defined as in 3GPP 23.201 v 18.1.0 section 5.7. In various example embodiments, the PDU QoS set may contain one or more parameters that may be used to support the PDU sed based on QoS handling within the radio access network. The PDU set may comprise at least one of the following QoS characteristics: PDU set delay budget (PSDB), PDU set error (PSER), and/or PDU set integrated handling information (PSIHI). In one or more example embodiments, the handling requests provides the PCF 150A with one or more values associated with the PDU set QoS parameters and/or protocol description information. The protocol description information may comprise information regarding the application protocol, a header (e.g., real time protocol, secure real time protocol, etc.), and/or a payload type (e.g., H.264). In various example embodiments, the AF 130 may further transmit a real-time protocol (RTP)/secure real time protocol (SRTP) PDU header extension and/or payload type information to the UPF 140. In one or more example embodiments, the information transmitted to the UPF 140 is transmitted on the downlink (DL). In various example embodiments, the RTP header extension may be needed for communication between the AF 130 and at least UE 110 and/or UPF 140.

With further reference to FIG. 3, in various example embodiments, the PCF 150A may authorize the request received from the application function (AF) 130. In an instance in which the PCF authorizes the request from the AF, the PCF 150A may incorporate the information received from the AF 130 into a policy and charging control (PCC) rule. In one or more example embodiments, the PCF 150A transmits the PCC rule to the session management function (SMF) 150B. In an instance in which the PCF does not authorize the request from the AF, the PDU set QoS parameters and protocol description information may be statically configured in the 5GS. In various example embodiments, the SMF 150B determines the QoS flow for the extended reality (XR) traffic service data flow. The SMF 150B may simultaneously and/or individually transmit a new PDU set QoS parameters to the next generation radio access network (NG RAN) component 120, and the protocol description information and/or PDU set information comprising information regarding marking indications to the PDU session anchor (PSA) user plane function (UPF) 140. The PSA UPF 140 determines and implements specific rules configured for detecting one or more RTP/SRTP header(s), detecting payload of DL PDUs, determining PDU sets, and/or extracting PDU set information. In one or more example embodiments, the specific rules are based at least in part on the received protocol description. In other embodiments, the PSA UPF 140 may alternatively be configured for implementing one or more specific procedures to identify PDU sets in, for instance, a situation where the PSA UPF 140 does not receive specific protocol description information from the SMF 150B (e.g., for proprietary application protocols other than RTP).

With even further reference to FIG. 3, in various example embodiments, the PDU session anchor (PSA) user plane function (UPF) 140 is configured to support detection of PDU sets and/or marking of PDU sets by transmitting one or more general packet radio service (GPRS) tunnelling protocol-user plane (GTP-U) packets (e.g., header extension) to the at least one new generation radio access network (NG RAN) component 120. In various example embodiments, the GTP-U header comprises information regarding the PDU set. The information may include at least one of the following: PDU set sequence number, indication of end PDU of the PDU set, PDU sequence number within a PDU set, PDU set size in bytes, PDU set importance that identifies the importance of the PDU set with a quality of service (QoS) flow, and/or the like. In various example embodiments, the PDU set importance may be the only GTP-U parameter provided by the UPF that may differentiate PDU sets according to the type of application/media layer payload/attributes. The RAN component 120 is configured to integrate and/or differentiate handling of one or more PDU set(s) based at least in part on new QoS parameters received from the session management function (SMF) 150B that are applicable to the group of PDUs that for a PDU set. The new QoS parameters may be at least one of the following: PDU set error rate (PSER), PDU set delay budget (PSDB), and/or a PDU set integrated handling indicator (PSIHI). In various example embodiments, the PSIHI may be used by the RAN component 120 to indicated whether all PDUs in a PDU set are necessary by the application for it to process the application layer information.

It will be appreciated that certain example embodiments described herein arise in the context of a telecommunications network, including but not limited to a telecommunications network that conforms to and/or otherwise incorporates aspects of a 5th generation (5G) architecture. While FIGS. 1-3 illustrate various configurations and/or components of an example architecture of a communications network, many other systems, system configurations, networks, network entities, and pathways/protocols for communication therein are contemplated and considered within the scope of this subject disclosure.

While the methods, devices/apparatuses, and computer program products/codes described herein are described within the context of a 5th generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the subject disclosure.

One or more of the following Figures illustrate example transmissions between the UE 110, the RAN 120, the AF 130, the UPF 140, the PCF 150A, and/or the SMF 150B to optimize configuration of extension headers for protocol data units of a communication system, according to one or more embodiments.

FIGS. 4A-4B illustrate an example downlink (DL) implementation of a signal flow in accordance with an example embodiment in which a user plane function (UPF) is configured to remove one or more real-time protocol (RTP) header extension from one or more protocol data unit(s) (PDU(s)) it receives. At operation 1 of FIG. 4A, the application function (AF) 130 may transmit a request to a core network 150 for extended reality (XR) PDU set handling. In one or more example embodiments, the core network 150 may include at least a NEF, the SMF 150B, and/or the PCF 150A. The request may comprise a XR protocol description and/or a request for real time protocol (RTP) header extension removal. In one or more example embodiments, the XR protocol description includes a header extension containing PDU set information for a 5GS such as, for example, a 3GPP Service and System Aspects 4 (SA4) header extension for an XR PDU set identification related to codecs. In various example embodiments, an SA4 header extension for an XR PDU set identification may be used for PDU set identification. In various example embodiments, an SA4 header extension for an XR PDU set identification may be specifically designed to carry information to the 5GS and not to the application client/server. Additionally or alternatively, an SA4 header extension for an XR PDU set identification may explicitly carry PDU set information. As shown in operation 2, the core network 150 determines that a user plane function is able to remove the RTP header extension and transmits a response to the AF 130.

As shown in operation 3*a*, the core network 150 is configured to transmit a rule comprising an indication for header extension (e.g., RTP header extension) removal to the user plane function (UPF) 140. In one or more example embodiments, the session management function (SMF) is configured to transmit the rule. In one or more example embodiments, the rule is a forwarding action rule, a quality enforcement rule, a packet detection rule, or another type of rule. In some instances, before transmission of the rule, a policy control function (PCF) within the core network 150 is configured to transmit a policy and charging control (PCC) rule to the SMF. In one or more example embodiments, the PCC rule contains a "header extension removal" request. The SMF may determine a quality of service (QoS) flow before transmitting the rule to the UPF. As shown in operation 3*b*, the UPF 140 transmits a header extension removal response to the core network 150 in response to receiving the forwarding action rule.

As shown in operation 4, the application function (AF) 130 may transmit one or more PDUs comprising a header extension, such as, an SA4 header extensions to a user plane function (UPF) 140. As shown in operation 5, the UPF may determine one or more PDU sets and/or one or more PDU set parameters based at least in part on the SA4 header extensions received from the AF 130. As shown in operation 6, the UPF 140 may be configured to determine and/or remove one or more real-time protocol (RTP) header extension(s). The UPF 140 may remove the RTP header extension from one or more packets and/or adjust one or more parameters associated with the packet as needed (e.g., adjust packet size, etc.). In various example embodiments, the removal of the header extension (e.g., RTP header extension) may be configured to reduces unnecessary bits of the header packet, reduce air-interference usage, reduce transport network resource, and/or reduce packet fragmentation.

As shown in operation 7 of FIG. 4B, the user plane function (UPF) 140 is configured to add the new PDU set parameters to a general packet radio service (GPRS) tunneling protocol-user plane (GTP-U) header. As shown in operation 8, the UPF 140 may transmit the PDU to the next generation radio access network (NG RAN) component 120 for PDU set handling. As shown in operation 9, the RAN component 120 performs PDU set differentiated and integrated packet handling. As shown in operation 10, the RAN component 120 may transmit the PDU to the UE 110. The transmitted PDU may be without a header extension (e.g., real-time protocol header extension).

FIG. 5A-5B illustrate an example uplink (UL) implementation of a signal flow in accordance with an example embodiment in which the UE 110 is configured to remove one or more header extensions, such as, a real time protocol (RTP) header extension from one or more protocol data unit(s) (PDU(s)) it receives. At operation 1 of FIG. 5A, the AF 130 may transmit a request to the core network 150 for extended reality (XR) PDU set handling. In one or more example embodiments, the core network 150 may include at least NEF, the SMF 150B, and/or the PCF 150A. The request may comprise a XR protocol description and/or a request for header extension (e.g., real-time protocol (RTP) header extension) removal. In one or more example embodiments, the XR protocol description includes an SA4 Header extension for XR PDU set identification. As shown in operation 2, the PCF of the core network 150 may determine that at least one UE 110 is able to remove a header extension (e.g., RTP header extension). The PCF may be further configured to transmit a response to the AF 130 simultaneously and/or individually upon determining that at least one UE 110 is able to remove the (RTP) header extension.

As shown in operation 3, in various example embodiments, the core network 150 is configured to transmit a rule comprising an indication for header extension removal (e.g., RTP header extension removal) to the UE 110. In one or more example embodiments, the session management function (SMF) is configured to transmit the rule. In one or more example embodiments, the rule is a QoS rule or another type of rule. In some instances, before transmission of the action rule, a policy control function (PCF) within the core network 150 is configured to transmit a policy and charging control (PCC) rule to the SMF. In one or more example embodiments, the PCF may trigger a PDU session modification procedure in order to update the UE to remove the header extension. In one or more example embodiments, the PCC rule contains a "header extension removal" request. The SMF determines a quality of service (QoS) flow before transmitting the rule to the at least one UE 110. As shown in operation 4, the application function (AF) 130 may transmit one or more PDUs comprising a header extension, such as, an SA4 header extensions to the at least one UE 110. As shown in operation 5, the UE 110 may determine one or more PDU sets and/or one or more PDU set parameters based at least in part on the received SA4 header extensions received from the AF 130. In various example embodiments, the parameters may include at least one of the following: PDU set sequence number, indication of an end PDU of the PDU set, PDU sequence number within a PDU set, PDU set size in bytes, and/or PDU set importance.

As shown in operation 6 of FIG. 5B, the UE 110 may be configured to determine and/or remove one or more header extension(s) (e.g., real-time protocol header extension). In various example embodiments, the removal of the header extension (e.g., RTP header extension) may be configured to reduces unnecessary bits of the header packet, reduce air-interference usage, reduce transport network resource, and/or reduce packet fragmentation The UE 110 may remove the header extension (e.g., RTP header extension) from one or more packets and/or adjust one or more parameters associated with the packet as needed (e.g., adjust packet size, etc.). As shown in operation 7, the UE 110 is configured to transmit the PDU without the header extension on an uplink (UL) transmission to the next generation radio access network (NG RAN) component 120. As shown in operation 8, the RAN component 120 is configured to transmit the PDU without the header extension to at least one user plane function (UPF) 140 and/or at least one application function (AF) 130. In various example embodiments, an AF that exchanges signaling with one or more 5GS may be an application server that exchanges user plane packets with at least one UE.

Referring now to FIGS. 6-9, example flowcharts of the operations performed by an apparatus, such as the apparatus 200 of FIG. 2 embodied by an application function, a network exposure function, a user plane function, and at least one user equipment, respectively.

Referring now to FIG. 6, a method 600 is illustrated that can be carried out by an apparatus as embodied by an application function (e.g., the AF 130) with the apparatus 200 including means, such as the processor 202, the memory 204, the network interface 206, or the like, for, based on (e.g., in response to) determining a protocol description indicating PDU set information related to extended reality data, causing transmission of a handling request for the PDU set that comprises at least a request for removal of a header extension related to the PDU set information. See block 602. The request may additionally comprise the protocol description for XR media flow indicating PDU set information. In some example embodiments, the header extensions may be a real-time protocol (RTP) header extension. In various example embodiments, the protocol description may comprise information regarding the header extension. The information may include at least one of the following: an application protocol, header type, and/or payload type.

The apparatus 200 also includes means, such as the processor 202, the memory 204, the network interface 206, or the like, for, based on (e.g., in response to) an indication that the header extension is removable by a user plane function of a core network, causing transmission of at least one PDU of the PDU set comprising the header extension. See block 604. The application function may be configured to transmit the at least one PDU of the PDU set upon receiving an indication, from a PCF (e.g., the PCF 150A) of the core network, that the header extension is removable by a UPF (e.g., the UPF 140) of a core network. In some example embodiments, the PCF and/or the UPF may be within the same core network. The transmission of the at least one PDU may further comprise causing transmission of the at least one PDU comprising the header extension to the UPF to facilitate removal of the header extension from the at least one PDU via the UPF. In other embodiments, the transmission of the at least one PDU may comprise causing transmission of the at least one PDU comprising the header extension to the UPF to facilitate provision of the at least one PDU without the header extension to a UE (e.g., the UE 102).

Referring now to FIG. 7, an example flowchart illustrating the operations performed, such as by the apparatus 200 as depicted in FIG. 2 and embodied as a PCF (e.g., the PFC 150A) of a core network. In one or more example embodiments, the core network comprises at least a session management function, policy control function, and/or a network exposure function. Referring now to FIG. 7, a method 700 is illustrated that can be carried out by an apparatus as embodied by a PCF (e.g., the PFC 150A) comprising at least a session management function, policy control function, and/or a network exposure function with the apparatus 200 including means, such as the processor 202, the memory 204, the network interface 206, or the like, for receiving, from an application function of a core network, a handling request for an XR media flow indicating PDU set information that comprises a protocol description and a request for removal of a header extension related to the PDU set. See block 702. The handling request may be transmitted from one or more application function (e.g., AF 130) within a core network. In one or more example embodiments, the handling request may comprise a protocol description applicable to the PDU set. In various example embodiments, the handling request may further comprise a request for removal of a header extension related to the PDU. The header extension may be a real-time protocol (RTP) header extension. In various example embodiments, the protocol description received comprises information regarding the header extension. The protocol description is configured to comprise information regarding at least one of the following: application protocol, header type, and/or payload type.

The apparatus 200 further includes means, such as the processor 202, the memory 204, the network interface 206, for determining, based on the protocol description, that a user plane function of the core network is capable of removing the header extension for the PDU set. See block 704. The UPF may indicate its ability to remove the header extension (e.g., RTP header extension) via a response to a policy control function. The policy control function (PCF) within the core network, upon determining the UPF is capable of removing the header extension, may be further configured to transmit a response towards an application function based at least in part on the determination made by the UPF. In various example embodiments, the PCF may transmit the response to a network exposure function (NEF). In one or more example embodiments, the NEF then transmits the response to the application function. In other embodiments, the PCF may transmit the response directly to the application function.

The apparatus 200 further include means, such as the processor 202, the memory 204, the network interface 206, or the like, for causing a rule indication to be provided to the user plane function for removal of the header extension related to the PDU set. See block 706. The rule indication may be provided to a user plane function (UPF) via a session management function within a core network. In various example embodiments, the header extension may be a real-time protocol (RTP) header extension.

Referring now to FIG. 8, an example flowchart illustrating the operations performed, such as by the apparatus 200 as depicted in FIG. 2 and embodied as a UPF (e.g., UPF 140). Referring now to FIG. 8, a method 800 is illustrated that can be carried out by an apparatus as embodied by a UPF (e.g., UPF 140) with the apparatus 200 including means, such as the processor 202, the memory 204, the network interface 206, or the like, for receiving an indication from a policy control function (PCF) of a core network for removal of a header extension for a PDU set. See block 802. In various example embodiments, the header extension may be a real-time protocol (RTP) header extension for extended reality (XR).

The apparatus 200 further includes means, such as the processor 202, the memory 204, the network interface, or the like, for receiving at least one PDU of the PDU set comprising the header extension from an application function. See block 804. In various example embodiments, an application function may be configured to transmit the at least one PDU of the PDU set to the user plane function (UPF). In some example embodiments, the at least one PDU may comprise a SA4 header extension. In one or more example embodiments, the SA4 header extension may be a SA4 real-time protocol (RTP) header extension.

The apparatus 200 further includes means, such as the processor 202, the memory 204, the network interface, or the like, for, in response to receiving the at least one PDU, causing removal of the header extension from the at least one PDU and/or adjusting one or more parameters for the at least one PDU. See block 806. The user plane function (UPF) may be further configured to determine at least one PDU set parameter for a PDU set. In one or more example embodiments, the determination of the parameters is based at least in part on the header extension. The UPF may further cause the removal of the header extension (e.g., real-time protocol (RTP) header extension) based at least in part on the at least one determined PDU set parameters. In various example embodiments the UPF removes the header extension (e.g., RTP header extension) from a packet and adjusts the parameters (e.g., packet size, etc.) as needed. In various example embodiments, the UPF may be further configured to add a general packet radio service (GPRS) tunneling protocol-user plane (GTP-U) header extension. In one or more example embodiments, the GTP-U header extension may comprise at least one PDU set parameters. The UPF may be further configured to transmit the GTP-U header extension to at least one radio access network (RAN) components.

Referring now to FIG. 9, an example flowchart illustrating the operations performed, such as by the apparatus 200 as depicted in FIG. 2 and embodied as the UE 110. Referring now to FIG. 9, a method 900 is illustrated that can be carried out by an apparatus as embodied by at least one user equipment (e.g., the UE 110) with the apparatus 200 including means, such as the processor 202, the memory 204, the network interface 206, or the like, for receiving, from a system management function of a core network, a QoS rule comprising an indication for removal of a header extension for a PDU set. See block 902. The QoS rule may comprise an indication for removal of a header extension (e.g., real-time protocol (RTP) header extension) for a PDU set. In various example embodiments, the QoS rule may be further configured to instruct the user equipment to remove the header extension for at least one PDU set in the uplink (UL) configuration.

The apparatus 200 further includes means, such as the processor 202, the memory 204, the network interface, or the like, for receiving at least one PDU of the PDU set comprising a header extension from an application. See block 904. The application may be an application client, an application on a UE, or another type of application. The user equipment may receive the at least one PDU of the PDU set comprising a header extension from an application. In various example embodiments, the application may be an application function external to the UE. In other embodiments, the application may be a UE application (e.g., an application client). In various example embodiments, the header extension may be a SA4 header extension comprising information regarding removal of a header extension.

The apparatus 200 further includes means, such as the processor 202, the memory 204, the network interface, or the like, for, in response to receiving the at least one PDU, causing removal of the header extension from the at least one PDU and/or adjusting one or more parameters for the at least one PDU. See block 906. In various example embodiments, the UE may remove the header extension (e.g., real-time protocol (RTP) header extension) based at least in part on the received PDU comprising a header extension, such as, a SA4 header extension. The UE may be further to adjust one or more parameter (e.g., packet size, etc.) based at least in part on the PDU received comprising the SA4 header extension. The removal of the header extension (e.g., RTP header extension) may be configured to reduce unnecessary bits of the header packet, reduce air-interference usage, reduce transport network resource, and/or reduce packet fragmentation.

The apparatus 200 further includes means, such as the processor 202, the memory 204, the network interface, or the like, for causing transmission of the at least one PDU without a header extension to at least one radio access network. See block 908. The transmission of the at least one PDU may be configured to be without a real-time protocol (RTP) header extension. In various example embodiments, the UE 110 may transmit the PDU without header extension (e.g., RTP header extension) to one or more radio access networks. In one or more example embodiments, the transmission is completed on an uplink transmission. In one or more example embodiments, causing transmission of the at least one PDU comprises causing transmission of the at least one PDU without the header extension to a user plane function and/or an application function via the radio access network.

The method, apparatus and computer program product provide numerous advantages including, in an example embodiment, improvements in 5G devices (e.g., user equipment, user plane functions, etc.) interaction with an application to coordinate header extension removal (e.g., real-time protocol (RTP) header extension removal) for at least one PDU. Additionally, the method, apparatus and computer program product of an example embodiment provide for reduction of unnecessary bits of the header packet, reduction of air-interference, reduction of transport network resource, and/or reduction of packet fragmentation.

The following example embodiments pertain to further aspects of the subject disclosure.

Example Embodiment 1 is a method that comprises: based on determining a protocol description indicating protocol data unit (PDU) set information related to extended reality data, causing transmission of a handling request for the PDU set that comprises at least a request for removal of a header extension related to the PDU set; and based on an indication that the header extension is removable by a user plane function of a core network, causing transmission of at least one PDU of the PDU set comprising the header extension.

In Example Embodiment 2, the subject matter of Example Embodiment 1 can optionally include the header extension being a real-time protocol (RTP) header extension.

In Example Embodiment 3, the subject matter of Example Embodiment 1 can optionally include the protocol description comprising information regarding the header extension.

In Example Embodiment 4, the subject matter of Example Embodiment 1 can optionally include the protocol description comprising information regarding at least one of the following: an application protocol, header type, and/or payload type.

In Example Embodiment 5, the subject matter of Example Embodiment 1 can optionally include causing transmission of the handling request comprises causing transmission of the handling request to a policy control function of the core network.

In Example Embodiment 6, the subject matter of Example Embodiment 1 can optionally include causing transmission of the at least one PDU to comprise causing transmission of the at least one PDU comprising the header extension to the user plane function to facilitate removal of the header extension from the at least one PDU via the user plane function.

In Example Embodiment 7, the subject matter of Example Embodiment 1 can optionally include causing transmission of the at least one PDU to comprise causing transmission of the at least one PDU comprising the header extension to the user plane function to facilitate provision of the at least one PDU without the header extension to a user equipment.

In Example Embodiment 8, the subject matter of Example Embodiment 1 can optionally include the handling request further comprising the protocol description for the PDU set.

Example Embodiment 9 is an apparatus comprising: at least one processor; and at least one memory storing instructions that, when executed by the at least one processor, cause the apparatus to at least perform: based on determining a protocol description indicating data unit (PDU) set information related to extended reality data, cause transmission of a handling request for the PDU set that comprises at least a request for removal of a header extension related to the PDU set; and based on an indication that the header extension is removable by a user plane function of a core network, cause transmission of at least one PDU of the PDU set that comprises the header extension.

In Example Embodiment 10, the subject matter of Example Embodiment 9 can optionally include the header extension being a real-time protocol (RTP) header extension.

In Example Embodiment 11, the subject matter of Example Embodiment 9 can optionally include the protocol description comprising information regarding the header extension.

In Example Embodiment 12, the subject matter of Example Embodiment 9 can optionally include the protocol description comprising information regarding at least one of the following: an application protocol, header type, and/or payload type.

In Example Embodiment 13, the subject matter of Example Embodiment 9 can optionally include causing transmission of the handling request to comprise causing transmission of the handling request to a policy control function of the core network.

In Example Embodiment 14, the subject matter of Example Embodiment 9 can optionally include causing transmission of the at least one PDU to comprise causing transmission of the at least one PDU comprising the header extension to the user plane function to facilitate removal of the header extension from the at least one PDU via the user plane function.

In Example Embodiment 15, the subject matter of Example Embodiment 9 can optionally include causing transmission of the at least one PDU to comprise causing transmission of the at least one PDU comprising the header extension to the user plane function to facilitate provision of the at least one PDU without the header extension to a user equipment.

In Example Embodiment 16, the subject matter of Example Embodiment 9 can optionally include the handling request further comprises the protocol description for the PDU set.

Example Embodiment 17 is a non-transitory computer-readable storage medium comprising program instructions stored thereon that are configured to perform at least the following: based on determining a protocol description indicating protocol data unit (PDU) set information related to extended reality data, causing transmission of a handling request for the PDU set that comprises at least a request for removal of a header extension related to the PDU set; and based on an indication that the header extension is removable by a user plane function of a core network, causing transmission of at least one PDU of the PDU set comprising the header extension.

In Example Embodiment 18, the subject matter of Example Embodiment 17 can optionally include the header extension being a real-time protocol (RTP) header extension.

In Example Embodiment 19, the subject matter of Example Embodiment 17 can optionally include the protocol description comprising information regarding the header extension.

In Example Embodiment 20, the subject matter of Example Embodiment 17 can optionally include the protocol description comprising information regarding at least one of the following: an application protocol, header type, and/or payload type.

In Example Embodiment 21, the subject matter of Example Embodiment 17 can optionally include causing transmission of the handling request to comprise causing transmission of the handling request to a policy control function of the core network.

In Example Embodiment 22, the subject matter of Example Embodiment 17 can optionally include causing transmission of the at least one PDU to comprise causing transmission of the at least one PDU comprising the header extension to the user plane function to facilitate removal of the header extension from the at least one PDU via the user plane function.

In Example Embodiment 23, the subject matter of Example Embodiment 17 can optionally include causing transmission of the at least one PDU to comprises causing transmission of the at least one PDU comprising the header extension to the user plane function to facilitate provision of the at least one PDU without header extension to a user equipment.

In Example Embodiment 24, the subject matter of Example Embodiment 17 can optionally include the handling request further comprises the protocol description for the PDU set.

Example Embodiment 25 is an apparatus comprising: based on determining a protocol description indicating protocol description unit (PDU) set information related to extended reality data, means for causing transmission of a handling request for the PDU set that comprises at least a request for removal of a header extension related to the PDU set; and based on an indication that the header extension is removable by a user plane function of a core network, means for causing transmission of at least one PDU of the PDU set comprising the header extension.

In Example Embodiment 26, the subject matter of Example Embodiment 25 can optionally include the header extension being a real-time protocol (RTP) header extension.

In Example Embodiment 27, the subject matter of Example Embodiment 25 can optionally include the protocol description comprising information regarding the header extension.

In Example Embodiment 28, the subject matter of Example Embodiment 25 can optionally include the protocol description comprising information regarding at least one of the following: an application protocol, header type, and/or payload type.

In Example Embodiment 29, the subject matter of Example Embodiment 25 can optionally include causing transmission of the handling request to comprise causing transmission of the handling request to a policy control function of the core network.

In Example Embodiment 30, the subject matter of Example Embodiment 25 can optionally include the means for causing transmission of the at least one PDU to comprise means for causing transmission of the at least one PDU comprising the header extension to the user plane function to facilitate removal of the header extension from the at least one PDU via the user plane function.

In Example Embodiment 31, the subject matter of Example Embodiment 25 can optionally include the means for causing transmission of the at least one PDU to comprises means for causing transmission of the at least one PDU comprising the header extension to the user plane function to facilitate provision of the at least one PDU without the header extension to a user equipment.

In Example Embodiment 32, the subject matter of Example Embodiment 25 can optionally include the handling request further comprises the protocol description for the PDU set.

Example Embodiment 33 is a method comprising: receiving, from an application function of a core network, a handling request for a protocol data unit (PDU) set that comprises a protocol description and a request for removal of a header extension related to the PDU set; determining, based on the protocol description, that a user plane function of the core network is capable of removing the header extension for the PDU set; and causing a rule indication to be provided to the user plane function for removal of the header extension related to the PDU set.

In Example Embodiment 34, the subject matter of Example Embodiment 33 can optionally include the header extension being a real-time protocol (RTP) header extension.

In Example Embodiment 35, the subject matter of Example Embodiment 33 can optionally include transmitting a response towards the application function based on the determination that the user plane function is capable of removing the header extension related to the PDU set.

In Example Embodiment 36, the subject matter of Example Embodiment 33 can optionally include the protocol description comprising information regarding the header extension.

In Example Embodiment 37, the subject matter of Example Embodiment 33 can optionally include the protocol description the comprise information regarding at least one of the following: application protocol, header type, and/or payload type.

Example Embodiment 38 is an apparatus comprising: at least one processor; and at least one memory storing instructions that, when executed by the at least one processor, cause the apparatus to at least perform: receive, from an application function of a core network, a handling request for a protocol data unit (PDU) set that comprises a protocol description and a request for removal of a header extension related to the PDU set; determine, based on the protocol description, that a user plane function of the core network is capable of removing the header extension for the PDU set; and cause a rule indication to be provided to the user plane function for removal of the header extension related to the PDU set.

In Example Embodiment 39, the subject matter of Example Embodiment 38 can optionally include the header extension being a real-time protocol (RTP) header extension.

In Example Embodiment 40, the subject matter of Example Embodiment 38 can optionally include the instructions, when executed by that least one processor, further cause the apparatus to transmit a response towards the application function based on the determination that the user plane function is capable of removing the header extension related to the PDU set.

In Example Embodiment 41, the subject matter of Example Embodiment 38 can optionally include the protocol description comprising information regarding the header extension.

In Example Embodiment 42, the subject matter of Example Embodiment 38 can optionally include the protocol description comprising information regarding at least one of the following: application protocol, header type, and/or payload type.

Example Embodiment 43 is a non-transitory computer-readable storage medium comprising program instructions stored thereon that are configured to perform at least the following: receiving, from an application function of a core network, a handling request for a protocol data unit (PDU) set that comprises a protocol description and a request for removal of a header extension related to the PDU set; determining, based on the protocol description, that a user plane function of the core network is capable of removing the header extension for the PDU set; and causing a rule indication to be provided to the user plane function for removal of the header extension related to the PDU set.

In Example Embodiment 44, the subject matter of Example Embodiment 43 can optionally include the header extension being a real-time protocol (RTP) header extension.

In Example Embodiment 45, the subject matter of Example Embodiment 43 can optionally include the instructions being further configured for transmitting a response towards the application function based on the determination that the user plane function is capable of removing the header extension related to the PDU set.

In Example Embodiment 46, the subject matter of Example Embodiment 43 can optionally include the protocol description comprising information regarding the header extension.

In Example Embodiment 47, the subject matter of Example Embodiment 43 can optionally include the protocol description comprising information regarding at least one of the following: application protocol, header type, and/or payload type.

Example Embodiment 48 is an apparatus comprising: means for receiving, from an application function of a core network, a handling request for a protocol data unit (PDU) set that comprises a protocol description and a request for removal of a header extension related to the PDU set; means for determining, based on the protocol description, that a user plane function of the core network is capable of removing the header extension for the PDU set; and means for causing a rule indication to be provided to the user plane function for removal of the header extension related to the PDU set.

In Example Embodiment 49, the subject matter of Example Embodiment 48 can optionally include the header extension being a real-time protocol (RTP) header extension.

In Example Embodiment 50, the subject matter of Example Embodiment 48 can optionally include means for transmitting a response towards the application function based on the determination that the user plane function is capable of removing the header extension related to the PDU set.

In Example Embodiment 51, the subject matter of Example Embodiment 48 can optionally include the protocol description comprising information regarding the header extension.

In Example Embodiment 52, the subject matter of Example Embodiment 48 can optionally include the protocol description comprising information regarding at least one of the following: application protocol, header type, and/or payload type.

Example Embodiment 53 is a method comprising receiving an indication from a policy control function of a core network for removal of a header extension for a protocol data unit (PDU) set; receiving at least one PDU of the PDU set comprising the header extension from an application function; and in response to receiving the at least one PDU, causing removal of the header extension from the at least one PDU; and adjusting one or more parameters for the at least one PDU.

In Example Embodiment 54, the subject matter of Example Embodiment 53 can optionally include the header extension being a real-time protocol (RTP) header extension.

In Example Embodiment 55, the subject matter of Example Embodiment 53 can optionally include determining at least one PDU set parameter for the PDU set based on the header extension; and causing the removal of the header extension from the PDU based on the at least one PDU set parameter.

In Example Embodiment 56, the subject matter of Example Embodiment 55 can optionally include adding a GPRS tunneling protocol-user plane header extension comprising the at least one PDU set parameter to a GPRS tunneling protocol-user plane header of the PDU.

In Example Embodiment 57, the subject matter of Example Embodiment 55 can optionally include transmitting the at least one PDU to at least one radio access network.

Example Embodiment 58 is an apparatus comprising: at least one processor; and at least one memory storing instructions that, when executed by the at least one processor, cause the apparatus to at least perform: receive an indication from a policy control function of a core network for removal of a header extension for a protocol data unit (PDU) set; receive at least one PDU of the PDU set comprising the header extension from an application function; and in response to receiving the at least one PDU, cause removal of the header extension from the at least one PDU; and adjust one or more parameters for the at least one PDU.

In Example Embodiment 59, the subject matter of Example Embodiment 58 can optionally include the header extension being a real-time protocol (RTP) header extension.

In Example Embodiment 60, the subject matter of Example Embodiment 58 can optionally include the instructions, when executed by the at least one processor, further cause the apparatus to: determine at least one PDU set parameter for the PDU set based on the header extension; and cause the removal of the header extension from the PDU based on the at least one PDU set parameter.

In Example Embodiment 61, the subject matter of Example Embodiment 60 can optionally include the instructions, when executed by the at least one processor, further cause the apparatus to: add a GPRS tunneling protocol-user plane header extension comprising the at least one PDU set parameter to a GPRS tunneling protocol-user plane header of the PDU.

In Example Embodiment 62, the subject matter of Example Embodiment 60 can optionally include the instructions, when executed by the at least one processor, further cause the apparatus to transmit the at least one PDU to at least one radio access network.

Example Embodiment 63 is a non-transitory computer-readable storage medium comprising program instructions stored thereon that are configured to perform at least one of the following: receiving an indication from a policy control function of a core network for removal of a header extension for a protocol data unit (PDU) set; receiving at least one PDU of the PDU set comprising the header extension from an application function; and in response to receiving the at least one PDU, causing removal of the header extension from the at least one PDU; and adjusting one or more parameter for the at least one PDU.

In Example Embodiment 64, the subject matter of Example Embodiment 63 can optionally include the header extension is a real-time protocol (RTP) header extension.

In Example Embodiment 65, the subject matter of Example Embodiment 63 can optionally include the instructions are further configured for: determining at least one PDU set parameter for the PDU set based on the header extension; and causing the removal of the header extension from the PDU based on the at least one PDU set parameter.

In Example Embodiment 66, the subject matter of Example Embodiment 65 can optionally include the instructions are further configured for: adding a GPRS tunneling protocol-user plane header extension comprising the at least one PDU set parameter to a GPRS tunneling protocol-user plane header of the PDU.

In Example Embodiment 67, the subject matter of Example Embodiment 65 can optionally include the instructions are further configured for transmitting the at least one PDU to at least one radio access network.

Example Embodiment 68 is an apparatus comprising: means for receiving an indication from a policy control function of a core network for removal of a header extension for a protocol data unit (PDU) set; means for receiving at least one PDU of the PDU set comprising the header extension from an application function; and in response to receiving the at least one PDU, means for causing removal of the header extension from the at least one PDU; and means for adjusting one or more parameters for the at least one PDU.

In Example Embodiment 69, the subject matter of Example Embodiment 68 can optionally include the header extension being a real-time protocol (RTP) header extension.

In Example Embodiment 70, the subject matter of Example Embodiment 68 can optionally include: means for determining at least one PDU set parameter for the PDU set based on the header extension; and means for causing the removal of the header extension from the PDU based on the at least one PDU set parameter.

In Example Embodiment 71, the subject matter of Example Embodiment 70 can optionally include means for adding a GPRS tunneling protocol-user plane header extension comprising the at least one PDU set parameter to a GPRS tunneling protocol-user plane header of the PDU.

In Example Embodiment 72, the subject matter of Example Embodiment 70 can optionally include means for transmitting the at least one PDU to at least one radio access network.

Example Embodiment 73 is a method comprising: receiving, from a system management function of a core network, a quality of service (QoS) rule comprising an indication for removal of a header extension for a protocol data unit (PDU) set; receiving at least one PDU of the PDU set comprising a header extension from an application; and in response to receiving the at least one PDU, causing removal of the header extension from the at least one PDU; and adjusting one or more parameters for the at least one PDU; and causing transmission of the at least one PDU without the header extension to at least one radio access network.

In Example Embodiment 74, the subject matter of Example Embodiment 73 can optionally include the header extension being a real-time protocol (RTP) header extension.

In Example Embodiment 75, the subject matter of Example Embodiment 73 can optionally include causing transmission of the at least one PDU comprises causing transmission of the at least one PDU without the header extension to a user plane function via the radio access network.

Example Embodiment 76 is an apparatus comprising: at least one processor; and at least one memory storing instructions that, when executed by the at least one processor, cause the apparatus to at least perform: receive, from a system management function of a core network, a quality of service (QoS) rule comprising an indication for removal of a header extension for a protocol data unit (PDU) set; receive at least one PDU of the PDU set comprising a header extension from an application; and in response to receiving the at least one PDU, cause removal of the header extension from the at least one PDU; and adjust one or more parameters for the at least one PDU; and cause transmission of the at least one PDU without the header extension to at least one radio access network.

In Example Embodiment 77, the subject matter of Example Embodiment 76 can optionally include the header extension being a real-time protocol (RTP) header extension.

In Example Embodiment 78, the subject matter of Example Embodiment 76 can optionally include causing transmission of the at least one PDU comprises causing transmission of the at least one PDU without the header extension to a user plane function via the radio access network.

Example Embodiment 79 is a non-transitory computer-readable storage medium comprising program instructions stored thereon that are configured to perform at least the following: receiving, from a system management function of a core network, a quality of service (QoS) rule comprising an indication for removal of a header extension for a protocol data unit (PDU) set; receiving at least one PDU of the PDU set comprising a header extension from an application; and in response to receiving the at least one PDU, causing removal of the header extension from the at least one PDU; and adjusting one or more parameters for the at least one PDU; and causing transmission of the at least one PDU without the header extension to at least one radio access network.

In Example Embodiment 80, the subject matter of Example Embodiment 79 can optionally include the header extension being a real-time protocol (RTP) header extension.

In Example Embodiment 81, the subject matter of Example Embodiment 79 can optionally include, wherein causing transmission of the at least one PDU comprises causing transmission of the at least one PDU without the header extension to a user plane function via the radio access network.

Example Embodiment 82 is an apparatus comprising: means for receiving, from a system management function of a core network, a quality of service (QoS) rule comprising an indication for removal of a header extension for a protocol data unit (PDU) set; means for receiving at least one PDU of the PDU set comprising a header extension from an application; and in response to receiving the at least one PDU, means for causing removal of the header extension from the at least one PDU; and means for adjusting one or more parameters for the at least one PDU; and means for causing transmission of the at least one PDU without the header extension to at least one radio access network.

In Example Embodiment 83, the subject matter of Example Embodiment 82 can optionally include the header extension is a real-time protocol (RTP) header extension.

In Example Embodiment 84, the subject matter of Example Embodiment 82 can optionally include means for causing transmission of the at least one PDU comprises means for causing transmission of the at least one PDU without the header extension to a user plane function via the radio access network.

Furthermore, implementations of the various techniques described herein may be implemented in digital electronic circuitry, or in computer hardware, firmware, software, or in combinations of them. Implementations may be implemented as a computer program product, e.g., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

A computer program, such as the computer program(s) described herein, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

The operations of the method may be performed by one or more programmable processors executing a computer program or computer program portions to perform functions by operating on input data and generating output. The operations of the method also may be performed by, and an apparatus may be implemented as, special purpose logic circuitry, e.g., an FPGA (field programmable gate array) or an ASIC (application-specific integrated circuit).

It will be understood that each block of the flowchart(s) and combination of blocks in the flowchart(s) can be implemented by various means, such as hardware, firmware, processor, circuitry, and/or other communication devices associated with execution of software including one or more computer program instructions. For example, one or more of the procedures described herein can be embodied by computer program instructions. In this regard, the computer program instructions which embody the procedures described herein can be stored, for example, by memory 204 of the apparatus 200 associated with the user equipment 110 or other apparatuses employing an embodiment of the subject disclosure and executed by the processor 202. As will be appreciated, any such computer program instructions can be loaded onto a computer or other programmable apparatus (for example, hardware) to produce a machine, such that the resulting computer or other programmable apparatus implements the functions specified in the blocks of the flowchart(s). These computer program instructions can also be stored in a computer-readable memory that can direct a computer or other programmable apparatus to function in a particular manner, such that the instructions stored in the computer-readable memory produce an article of manufacture the execution of which implements the function specified in the blocks of the flowchart(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart.

Accordingly, blocks of the flowchart(s) support combinations of means for performing the specified functions and combinations of operations for performing the specified functions for performing the specified functions. It will also be understood that one or more blocks of the flowchart(s), and combinations of blocks in the flowchart(s), can be implemented by special purpose hardware-based computer systems which perform the specified functions, or combinations of special purpose hardware and computer instructions.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. An apparatus comprising
at least one processor; and
at least one memory storing instructions that, when executed by the at least one processor, cause the apparatus at least to perform:
based on determining a protocol description indicating protocol data unit (PDU) set information related to extended reality data, causing transmission of a handling request for the PDU set that comprises at least a request for removal of a header extension related to the PDU set; and
based on an indication that the header extension is removable by a user plane function of a core network, causing transmission of at least one PDU of the PDU set comprising the header extension.

2. The apparatus of claim 1, wherein the header extension is a real-time protocol (RTP) header extension.

3. The apparatus of claim 1, wherein the protocol description comprises information regarding the header extension.

4. The apparatus of claim 1, wherein the protocol description comprises information regarding at least one of the following: an application protocol, header type, or payload type.

5. The apparatus of claim 1, wherein the instructions, when executed by the at least one processor, cause the apparatus at least to perform:
causing transmission of the handling request by causing transmission of the handling request to a policy control function of the core network.

6. The apparatus of claim 1, wherein the instructions, when executed by the at least one processor, cause the apparatus at least to perform:
causing transmission of the at least one PDU by causing transmission of the at least one PDU comprising the header extension to the user plane function to facilitate removal of the header extension from the at least one PDU via the user plane function.

7. The apparatus of claim 1, wherein the instructions, when executed by the at least one processor, cause the apparatus at least to perform:
causing transmission of the at least one PDU by causing transmission of the at least one PDU comprising the header extension to the user plane function to facilitate provision of the at least one PDU without the header extension to a user equipment.

8. The apparatus of claim 1, wherein the handling request further comprises the protocol description for the PDU set.

9. An apparatus comprising
at least one processor; and
at least one memory storing instructions that, when executed by the at least one processor, cause the apparatus at least to perform:
receiving, from an application function of a core network, a handling request for a protocol data unit (PDU) set that comprises a protocol description and a request for removal of a header extension related to the PDU set;
determining, based on the protocol description, that a user plane function of the core network is capable of removing the header extension for the PDU set; and
causing a rule indication to be provided to the user plane function for removal of the header extension related to the PDU set.

10. The apparatus of claim 9, wherein the header extension is a real-time protocol (RTP) header extension.

11. The apparatus of claim 9, wherein the instructions, when executed by the at least one processor, further cause the apparatus at least to perform:
transmitting a response towards the application function based on the determination that the user plane function is capable of removing the header extension related to the PDU set.

12. The apparatus of claim 9, wherein the protocol description comprises information regarding the header extension.

13. The apparatus of claim 9, wherein protocol description comprises information regarding at least one of the following: application protocol, header type, or payload type.

14. An apparatus comprising
at least one processor; and
at least one memory storing instructions that, when executed by the at least one processor, cause the apparatus at least to perform:
receiving, from a system management function of a core network, a quality of service (QoS) rule comprising an indication for removal of a header extension for a protocol data unit (PDU) set;
receiving at least one PDU of the PDU set comprising a header extension from an application; and
in response to receiving the at least one PDU,
causing removal of the header extension from the at least one PDU; and adjusting one or more parameters for the at least one PDU; and causing transmission of the at least one PDU without the header extension to at least one radio access network.

15. The apparatus of claim 14, wherein the header extension is a real-time protocol (RTP) header extension.

16. The apparatus of claim 14, wherein the instructions, when executed by the at least one processor, cause the apparatus at least to perform:

causing transmission of the at least one PDU by causing transmission of the at least one PDU without the header extension to a user plane function via the radio access network.

* * * * *